(12) United States Patent
Collar et al.

(10) Patent No.: US 8,033,909 B2
(45) Date of Patent: Oct. 11, 2011

(54) RANDOM SELECTION PROGRAM FOR AN OPTICAL DISC AND RELATED METHOD

(75) Inventors: Bradley T. Collar, Valencia, CA (US); Lewis S. Ostrover, Los Angeles, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 1226 days.

(21) Appl. No.: 10/845,369

(22) Filed: May 12, 2004

(65) Prior Publication Data
US 2005/0008348 A1 Jan. 13, 2005

Related U.S. Application Data

(60) Provisional application No. 60/469,671, filed on May 12, 2003.

(51) Int. Cl.
*A63F 9/00* (2006.01)
(52) U.S. Cl. ......................................................... 463/22
(58) Field of Classification Search .................. 463/9, 22
See application file for complete search history.

(56) References Cited

U.S. PATENT DOCUMENTS

| | | | | |
|---|---|---|---|---|
| 4,448,419 A * | 5/1984 | Telnaes | ............................ | 463/21 |
| 5,356,144 A * | 10/1994 | Fitzpatrick et al. | ............ | 463/22 |
| 5,702,302 A * | 12/1997 | Gauselmann | .................... | 463/20 |
| 5,959,717 A * | 9/1999 | Chaum | ............................ | 352/40 |
| 6,161,179 A * | 12/2000 | Seidel | ............................ | 713/168 |
| 6,229,952 B1 * | 5/2001 | Nonomura et al. | ............. | 386/95 |
| 6,263,344 B1 * | 7/2001 | Wu et al. | ..................... | 707/104.1 |
| 6,497,412 B1 * | 12/2002 | Bramm | ........................ | 273/430 |
| 6,987,925 B2 * | 1/2006 | Kinzer et al. | ................... | 386/69 |
| 7,010,213 B2 * | 3/2006 | Yeend et al. | ................... | 386/35 |
| 7,223,170 B2 * | 5/2007 | Kinzer et al. | ...................... | 463/9 |
| 2002/0006819 A1 * | 1/2002 | Kubo et al. | ..................... | 463/11 |
| 2002/0028705 A1 * | 3/2002 | Kelly | ............................... | 463/2 |
| 2002/0077170 A1 * | 6/2002 | Johnson et al. | ................. | 463/16 |
| 2002/0151339 A1 * | 10/2002 | Huang | ............................ | 463/12 |
| 2006/0025198 A1 * | 2/2006 | Gail et al. | ....................... | 463/19 |

OTHER PUBLICATIONS

"Lilo & Stitch's Island of Adventures," http://disney.go.com/disneyvideos/animatedfilms/stitchdvdgame/readmore.htm, Oct. 30, 2003, 2 pages.

* cited by examiner

*Primary Examiner* — Melba Bumgarner
*Assistant Examiner* — Seng Lim
(74) *Attorney, Agent, or Firm* — Connolly Bove Lodge & Hutz LLP; Jonathan A. Jaech

(57) ABSTRACT

A random selection program stored on an optical disc, which is played on an electronic device. The electronic device is coupled to an audio/visual output device. The electronic device includes a random number generator. The random selection program includes a random selection module and a program selector module. The random selection module is programmed to initiate the random number generator to generate randomly a selection. The program selector module is programmed to receive the selection and to initiate an audio/visual presentation that corresponds to the selection on the audio/visual output device.

23 Claims, 25 Drawing Sheets

INDEPENDENT MODE, S=6

48

PGC.1

PRE COMMAND

CMND.1 = RND GPRM12 7   ← 14

CMND.2 = COMP GPRM12 == 6 LINKPGN 6 1

CMND.3 = COMP GPRM12 == 5 LINKPGN 5 1

CMND.4 = COMP GPRM12 == 4 LINKPGN 4 1

CMND.5 = COMP GPRM12 == 3 LINKPGN 3 1

CMND.6 = COMP GPRM12 == 2 LINKPGN 2 1

CMND.7 = COMP GPRM12 == 1 LINKPGN 1 1

CMND.8 = GOTO 1

POST COMMAND

--- NONE ---

PGC.1 (Entry PGC)  
    Pre Command     ←53  
        Cmnd.1 = Comp GPRM14 != 65535 goto 4  
        Cmnd.2 = Comp GPRM13 != 65535 goto 4  
        Cmnd.3 = Comp GPRM15 == 65535 LinkPGN 1     # If all numbers are picked, game is over  
                                                           # Display "All Balls Picked, Game Over" message  
16→  Cmnd.4 = RND GPRM12 49                         # Randomize between 1 and S+1  
54→  Cmnd.5 = Comp GPRM11 != GPRM12 goto 9  
56→  Cmnd.6 = Add GPRM10 1  
58→  Cmnd.7 = Comp GPRM10 > 65500 LinkPGN 2    # If player has random 'bug', display error  
                                                            # message and avoid Infinite loop  
        Cmnd.8 = Goto 4  
60→  Cmnd.9 = Mov GPRM11 GPRM12  
62→  Cmnd.10 = Mov GPRM10 0  
        Cmnd.11 = Comp GPRM12 > 32 LinkPGCN 4     # If Random number is greater than 32  
        Cmnd.12 = Comp GPRM12 > 16 LinkPGCN 3     # If Random number is in the range 17-32  
        Cmnd.13 = LinkPGCN 2                            # If Random number is in the range 1-16  
    Post Command  
        ---- None ----  
PGC.2     ←64  
    Pre Command  
        Cmnd.1 = Comp GPRM12 != 16 goto 7         # Check if random number is "16"  
        Cmnd.2 = Mov GPRM12 32768              # Set 16th bit of GPRM12  
        Cmnd.3 = And GPRM12 GPRM13            # Perform logical AND arithmetic operation  
        Cmnd.4 = Comp GPRM12 == 32768 goto 97    # Check if "16" has been picked previously  
        Cmnd.5 = OR GPRM13 32768               # "16" has not been picked before, store pick in GPRM13  
        Cmnd.6 = LinkPGN 16                       # Program Selector - play audio/video corresponding to "16"  
        Cmnd.7 = Comp GPRM12 != 15 goto 13       # *** Repeat same process for other numbers ***  
        Cmnd.8 = Mov GPRM12 16384  
        Cmnd.9 = And GPRM12 GPRM13  
        Cmnd.10 = Comp GPRM12 == 16384 goto 97  
        Cmnd.11 = OR GPRM13 16384  
        Cmnd.12 = LinkPGN 15  
        Cmnd.13 = Comp GPRM12 != 14 goto 19  
        Cmnd.14 = Mov GPRM12 8192  
        Cmnd.15 = And GPRM12 GPRM13  
        Cmnd.16 = Comp GPRM12 == 8192 goto 97  
        Cmnd.17 = OR GPRM13 8192  
        Cmnd.18 = LinkPGN 14  
        Cmnd.19 = Comp GPRM12 != 13 goto 25  
        Cmnd.20 = Mov GPRM12 4096

Fig. 9a

```
Cmnd.21 = And GPRM12 GPRM13
Cmnd.22 = Comp GPRM12 == 4096 goto 97
Cmnd.23 = OR GPRM13 4096
Cmnd.24 = LinkPGN 13
Cmnd.25 = Comp GPRM12 != 12 goto 31
Cmnd.26 = Mov GPRM12 2048
Cmnd.27 = And GPRM12 GPRM13
Cmnd.28 = Comp GPRM12 == 2048 goto 97
Cmnd.29 = OR GPRM13 2048
Cmnd.30 = LinkPGN 12
Cmnd.31 = Comp GPRM12 != 11 goto 37
Cmnd.32 = Mov GPRM12 1024
Cmnd.33 = And GPRM12 GPRM13
Cmnd.34 = Comp GPRM12 == 1024 goto 97
Cmnd.35 = OR GPRM13 1024
Cmnd.36 = LinkPGN 11
Cmnd.37 = Comp GPRM12 != 10 goto 43
Cmnd.38 = Mov GPRM12 512
Cmnd.39 = And GPRM12 GPRM13
Cmnd.40 = Comp GPRM12 == 512 goto 97
Cmnd.41 = OR GPRM13 512
Cmnd.42 = LinkPGN 10
Cmnd.43 = Comp GPRM12 != 9 goto 49
Cmnd.44 = Mov GPRM12 256
Cmnd.45 = And GPRM12 GPRM13
Cmnd.46 = Comp GPRM12 == 256 goto 97
Cmnd.47 = OR GPRM13 256
Cmnd.48 = LinkPGN 9
Cmnd.49 = Comp GPRM12 != 8 goto 55
Cmnd.50 = Mov GPRM12 128
Cmnd.51 = And GPRM12 GPRM13
Cmnd.52 = Comp GPRM12 == 128 goto 97
Cmnd.53 = OR GPRM13 128
Cmnd.54 = LinkPGN 8
Cmnd.55 = Comp GPRM12 != 7 goto 61
Cmnd.56 = Mov GPRM12 64
Cmnd.57 = And GPRM12 GPRM13
Cmnd.58 = Comp GPRM12 == 64 goto 97
Cmnd.59 = OR GPRM13 64
Cmnd.60 = LinkPGN 7
Cmnd.61 = Comp GPRM12 != 6 goto 67
```

Fig. 9b

```
Cmnd.62 = Mov GPRM12 32
Cmnd.63 = And GPRM12 GPRM13
Cmnd.64 = Comp GPRM12 == 32 goto 97
Cmnd.65 = OR GPRM13 32
Cmnd.66 = LinkPGN 6
Cmnd.67 = Comp GPRM12 != 5 goto 73
Cmnd.68 = Mov GPRM12 16
Cmnd.69 = And GPRM12 GPRM13
Cmnd.70 = Comp GPRM12 == 16 goto 97
Cmnd.71 = OR GPRM13 16
Cmnd.72 = LinkPGN 5
Cmnd.73 = Comp GPRM12 != 4 goto 79
Cmnd.74 = Mov GPRM12 8
Cmnd.75 = And GPRM12 GPRM13
Cmnd.76 = Comp GPRM12 == 8 goto 97
Cmnd.77 = OR GPRM13 8
Cmnd.78 = LinkPGN 4
Cmnd.79 = Comp GPRM12 != 3 goto 85
Cmnd.80 = Mov GPRM12 4
Cmnd.81 = And GPRM12 GPRM13
Cmnd.82 = Comp GPRM12 == 4 goto 97
Cmnd.83 = OR GPRM13 4
Cmnd.84 = LinkPGN 3
Cmnd.85 = Comp GPRM12 != 2 goto 91
Cmnd.86 = Mov GPRM12 2
Cmnd.87 = And GPRM12 GPRM13
Cmnd.88 = Comp GPRM12 == 2 goto 97
Cmnd.89 = OR GPRM13 2
Cmnd.90 = LinkPGN 2
Cmnd.91 = Comp GPRM12 != 1 goto 97      # If not equal to "1" at this point, then must be "0" - illegal value
Cmnd.92 = Mov GPRM12 1
Cmnd.93 = And GPRM12 GPRM13
Cmnd.94 = Comp GPRM12 == 1 goto 97
Cmnd.95 = OR GPRM13 1
Cmnd.96 = LinkPGN 1
Cmnd.97 = LinkPGCN 1                    # Either illegal value or value already picked - go back and pick new
                                        # random number Post Command
Cmnd.1 = JumpRootMenu
```

PGC.3
   Pre Command
   Cmnd.1 = Comp GPRM12 != 32 goto 7
   Cmnd.2 = Mov GPRM12 32768
   Cmnd.3 = And GPRM12 GPRM14
   Cmnd.4 = Comp GPRM12 == 32768 goto 97
   Cmnd.5 = OR GPRM14 32768
   Cmnd.6 = LinkPGN 16
   Cmnd.7 = Comp GPRM12 != 31 goto 13
   Cmnd.8 = Mov GPRM12 16384
   Cmnd.9 = And GPRM12 GPRM14
   Cmnd.10 = Comp GPRM12 == 16384 goto 97
   Cmnd.11 = OR GPRM14 16384
   Cmnd.12 = LinkPGN 15
   Cmnd.13 = Comp GPRM12 != 30 goto 19
   Cmnd.14 = Mov GPRM12 8192
   Cmnd.15 = And GPRM12 GPRM14
   Cmnd.16 = Comp GPRM12 == 8192 goto 97
   Cmnd.17 = OR GPRM14 8192
   Cmnd.18 = LinkPGN 14
   Cmnd.19 = Comp GPRM12 != 29 goto 25
   Cmnd.20 = Mov GPRM12 4096
   Cmnd.21 = And GPRM12 GPRM14
   Cmnd.22 = Comp GPRM12 == 4096 goto 97
   Cmnd.23 = OR GPRM14 4096
   Cmnd.24 = LinkPGN 13
   Cmnd.25 = Comp GPRM12 != 28 goto 31
   Cmnd.26 = Mov GPRM12 2048
   Cmnd.27 = And GPRM12 GPRM14
   Cmnd.28 = Comp GPRM12 == 2048 goto 97
   Cmnd.29 = OR GPRM14 2048
   Cmnd.30 = LinkPGN 12
   Cmnd.31 = Comp GPRM12 != 27 goto 37
   Cmnd.32 = Mov GPRM12 1024
   Cmnd.33 = And GPRM12 GPRM14
   Cmnd.34 = Comp GPRM12 == 1024 goto 97
   Cmnd.35 = OR GPRM14 1024
   Cmnd.36 = LinkPGN 11
   Cmnd.37 = Comp GPRM12 != 26 goto 43
   Cmnd.38 = Mov GPRM12 512
   Cmnd.39 = And GPRM12 GPRM14

```
Cmnd.40 = Comp GPRM12 == 512 goto 97
Cmnd.41 = OR GPRM14 512
Cmnd.42 = LinkPGN 10
Cmnd.43 = Comp GPRM12 != 25 goto 49
Cmnd.44 = Mov GPRM12 256
Cmnd.45 = And GPRM12 GPRM14
Cmnd.46 = Comp GPRM12 == 256 goto 97
Cmnd.47 = OR GPRM14 256
Cmnd.48 = LinkPGN 9
Cmnd.49 = Comp GPRM12 != 24 goto 55
Cmnd.50 = Mov GPRM12 128
Cmnd.51 = And GPRM12 GPRM14
Cmnd.52 = Comp GPRM12 == 128 goto 97
Cmnd.53 = OR GPRM14 128
Cmnd.54 = LinkPGN 8
Cmnd.55 = Comp GPRM12 != 23 goto 61
Cmnd.56 = Mov GPRM12 64
Cmnd.57 = And GPRM12 GPRM14
Cmnd.58 = Comp GPRM12 == 64 goto 97
Cmnd.59 = OR GPRM14 64
Cmnd.60 = LinkPGN 7
Cmnd.61 = Comp GPRM12 != 22 goto 67
Cmnd.62 = Mov GPRM12 32
Cmnd.63 = And GPRM12 GPRM14
Cmnd.64 = Comp GPRM12 == 32 goto 97
Cmnd.65 = OR GPRM14 32
Cmnd.66 = LinkPGN 6
Cmnd.67 = Comp GPRM12 != 21 goto 73
Cmnd.68 = Mov GPRM12 16
Cmnd.69 = And GPRM12 GPRM14
Cmnd.70 = Comp GPRM12 == 16 goto 97
Cmnd.71 = OR GPRM14 16
Cmnd.72 = LinkPGN 5
Cmnd.73 = Comp GPRM12 != 20 goto 79
Cmnd.74 = Mov GPRM12 8
Cmnd.75 = And GPRM12 GPRM14
Cmnd.76 = Comp GPRM12 == 8 goto 97
Cmnd.77 = OR GPRM14 8
Cmnd.78 = LinkPGN 4
Cmnd.79 = Comp GPRM12 != 19 goto 85
Cmnd.80 = Mov GPRM12 4
```

Fig. 9e

```
Cmnd.81 = And GPRM12 GPRM14                              ┌─66
Cmnd.82 = Comp GPRM12 == 4 goto 97
Cmnd.83 = OR GPRM14 4
Cmnd.84 = LinkPGN 3
Cmnd.85 = Comp GPRM12 != 18 goto 91
Cmnd.86 = Mov GPRM12 2
Cmnd.87 = And GPRM12 GPRM14
Cmnd.88 = Comp GPRM12 == 2 goto 97
Cmnd.89 = OR GPRM14 2
Cmnd.90 = LinkPGN 2
Cmnd.91 = Comp GPRM12 != 17 goto 97    # If not equal to "17" then must be illegal value
Cmnd.92 = Mov GPRM12 1
Cmnd.93 = And GPRM12 GPRM14
Cmnd.94 = Comp GPRM12 == 1 goto 97
Cmnd.95 = OR GPRM14 1
Cmnd.96 = LinkPGN 1
Cmnd.97 = LinkPGCN 1                   # Either illegal value or value already picked - go back and pick new
                                       # random number Post Command
Cmnd.1 = JumpRootMenu
                                       ┌─68
PGC.4
  Pre Command
  Cmnd.1 = Comp GPRM12 != 48 goto 7
  Cmnd.2 = Mov GPRM12 32768
  Cmnd.3 = And GPRM12 GPRM15
  Cmnd.4 = Comp GPRM12 == 32768 goto 97
  Cmnd.5 = OR GPRM15 32768
  Cmnd.6 = LinkPGN 16
  Cmnd.7 = Comp GPRM12 != 47 goto 13
  Cmnd.8 = Mov GPRM12 16384
  Cmnd.9 = And GPRM12 GPRM15
  Cmnd.10 = Comp GPRM12 == 16384 goto 97
  Cmnd.11 = OR GPRM15 16384
  Cmnd.12 = LinkPGN 15
  Cmnd.13 = Comp GPRM12 != 46 goto 19
  Cmnd.14 = Mov GPRM12 8192
  Cmnd.15 = And GPRM12 GPRM15
  Cmnd.16 = Comp GPRM12 == 8192 goto 97
  Cmnd.17 = OR GPRM15 8192
  Cmnd.18 = LinkPGN 14
```

Fig. 9f

```
Cmnd.19 = Comp GPRM12 != 45 goto 25
Cmnd.20 = Mov GPRM12 4096
Cmnd.21 = And GPRM12 GPRM15
Cmnd.22 = Comp GPRM12 == 4096 goto 97
Cmnd.23 = OR GPRM15 4096
Cmnd.24 = LinkPGN 13
Cmnd.25 = Comp GPRM12 != 44 goto 31
Cmnd.26 = Mov GPRM12 2048
Cmnd.27 = And GPRM12 GPRM15
Cmnd.28 = Comp GPRM12 == 2048 goto 97
Cmnd.29 = OR GPRM15 2048
Cmnd.30 = LinkPGN 12
Cmnd.31 = Comp GPRM12 != 43 goto 37
Cmnd.32 = Mov GPRM12 1024
Cmnd.33 = And GPRM12 GPRM15
Cmnd.34 = Comp GPRM12 == 1024 goto 97
Cmnd.35 = OR GPRM15 1024
Cmnd.36 = LinkPGN 11
Cmnd.37 = Comp GPRM12 != 42 goto 43
Cmnd.38 = Mov GPRM12 512
Cmnd.39 = And GPRM12 GPRM15
Cmnd.40 = Comp GPRM12 == 512 goto 97
Cmnd.41 = OR GPRM15 512
Cmnd.42 = LinkPGN 10
Cmnd.43 = Comp GPRM12 != 41 goto 49
Cmnd.44 = Mov GPRM12 256
Cmnd.45 = And GPRM12 GPRM15
Cmnd.46 = Comp GPRM12 == 256 goto 97
Cmnd.47 = OR GPRM15 256
Cmnd.48 = LinkPGN 9
Cmnd.49 = Comp GPRM12 != 40 goto 55
Cmnd.50 = Mov GPRM12 128
Cmnd.51 = And GPRM12 GPRM15
Cmnd.52 = Comp GPRM12 == 128 goto 97
Cmnd.53 = OR GPRM15 128
Cmnd.54 = LinkPGN 8
Cmnd.55 = Comp GPRM12 != 39 goto 61
Cmnd.56 = Mov GPRM12 64
Cmnd.57 = And GPRM12 GPRM15
Cmnd.58 = Comp GPRM12 == 64 goto 97
Cmnd.59 = OR GPRM15 64
```

Cmnd.60 = LinkPGN 7
Cmnd.61 = Comp GPRM12 != 38 goto 67
Cmnd.62 = Mov GPRM12 32
Cmnd.63 = And GPRM12 GPRM15
Cmnd.64 = Comp GPRM12 == 32 goto 97
Cmnd.65 = OR GPRM15 32
Cmnd.66 = LinkPGN 6
Cmnd.67 = Comp GPRM12 != 37 goto 73
Cmnd.68 = Mov GPRM12 16
Cmnd.69 = And GPRM12 GPRM15
Cmnd.70 = Comp GPRM12 == 16 goto 97
Cmnd.71 = OR GPRM15 16
Cmnd.72 = LinkPGN 5
Cmnd.73 = Comp GPRM12 != 36 goto 79
Cmnd.74 = Mov GPRM12 8
Cmnd.75 = And GPRM12 GPRM15
Cmnd.76 = Comp GPRM12 == 8 goto 97
Cmnd.77 = OR GPRM15 8
Cmnd.78 = LinkPGN 4
Cmnd.79 = Comp GPRM12 != 35 goto 85
Cmnd.80 = Mov GPRM12 4
Cmnd.81 = And GPRM12 GPRM15
Cmnd.82 = Comp GPRM12 == 4 goto 97
Cmnd.83 = OR GPRM15 4
Cmnd.84 = LinkPGN 3
Cmnd.85 = Comp GPRM12 != 34 goto 91
Cmnd.86 = Mov GPRM12 2
Cmnd.87 = And GPRM12 GPRM15
Cmnd.88 = Comp GPRM12 == 2 goto 97
Cmnd.89 = OR GPRM15 2
Cmnd.90 = LinkPGN 2
Cmnd.91 = Comp GPRM12 != 33 goto 97   # If not equal to "33" at this point, then must be "49" - illegal value
Cmnd.92 = Mov GPRM12 1
Cmnd.93 = And GPRM12 GPRM15
Cmnd.94 = Comp GPRM12 == 1 goto 97
Cmnd.95 = OR GPRM15 1
Cmnd.96 = LinkPGN 1
Cmnd.97 = LinkPGCN 1    # Either illegal value or value already picked - go back and pick new
                        # random number Post Command
Cmnd.1 JumpRootMenu

DICE ROLL VALUE TABLE

| RANDOM NUMBER | DICE COMBINATION | ROLL VALUE (V) |
|---|---|---|
| 1 | 1 - 1 | 2 |
| 2 | 1 - 2 | 3 |
| 3 | 1 - 3 | 4 |
| 4 | 1 - 4 | 5 |
| 5 | 1 - 5 | 6 |
| 6 | 1 - 6 | 7 |
| 7 | 2 - 1 | 3 |
| 8 | 2 - 2 | 4 |
| 9 | 2 - 3 | 5 |
| 10 | 2 - 4 | 6 |
| 11 | 2 - 5 | 7 |
| 12 | 2 - 6 | 8 |
| 13 | 3 - 1 | 4 |
| 14 | 3 - 2 | 5 |
| 15 | 3 - 3 | 6 |
| 16 | 3 - 4 | 7 |
| 17 | 3 - 5 | 8 |
| 18 | 3 - 6 | 9 |
| 19 | 4 - 1 | 5 |
| 20 | 4 - 2 | 6 |
| 21 | 4 - 3 | 7 |
| 22 | 4 - 4 | 8 |
| 23 | 4 - 5 | 9 |
| 24 | 4 - 6 | 10 |
| 25 | 5 - 1 | 6 |
| 26 | 5 - 2 | 7 |
| 27 | 5 - 3 | 8 |
| 28 | 5 - 4 | 9 |
| 29 | 5 - 5 | 10 |
| 30 | 5 - 6 | 11 |
| 31 | 6 - 1 | 7 |
| 32 | 6 - 2 | 8 |
| 33 | 6 - 3 | 9 |
| 34 | 6 - 4 | 10 |
| 35 | 6 - 5 | 11 |
| 36 | 6 - 6 | 12 |

Fig. 13

Declaration of Variables

GPRM1 = Player 1 Current Position (P1$_i$ = 1)
GPRM2 = Player 2 Current Position (P2$_i$ = 1)
GPRM3 = Random number for Roll (1-36)
GPRM4 = Roll Value (2-12)
GPRM5 = Current Player's Turn (1 = Player 1, 2 = Player 2)

PGC.1                                   ⟵ 82
   Pre Command
      Cmnd.1 = Mov GPRM1 1                 # Initialize Player 1 position to board position 1
      Cmnd.2 = Mov GPRM2 1                 # Initialize Player 2 position to board position 1
      Cmnd.3 = Mov GPRM5 1                 # Initialize Player Turn (Player 1 goes first)

Post Command
      Cmnd.1 = LinkPGCN 2                  # Go to random selection PGC PGC.2                                   ⟵ 84
   Pre Command
      Cmnd.1 = RND GPRM3 37               # Randomize number in range of 1-37
      Cmnd.2 = Comp GPRM3 != 36 Goto 4    # Check Random Number Value
      Cmnd.3 = Mov GPRM4 12 LinkPGN 36    # Set Roll Value and play appropriate dice configuration
      Cmnd.4 = Comp GPRM3 != 35 Goto 6
      Cmnd.5 = Mov GPRM4 11 LinkPGN 35
      Cmnd.6 = Comp GPRM3 != 34 Goto 8
      Cmnd.7 = Mov GPRM4 10 LinkPGN 34
      Cmnd.8 = Comp GPRM3 != 33 Goto 10
      Cmnd.9 = Mov GPRM4 9 LinkPGN 33
      Cmnd.10 = Comp GPRM3 != 32 Goto 12
      Cmnd.11 = Mov GPRM4 8 LinkPGN 32
      Cmnd.12 = Comp GPRM3 != 31 Goto 14
      Cmnd.13 = Mov GPRM4 7 LinkPGN 31
      Cmnd.14 = Comp GPRM3 != 30 Goto 16
      Cmnd.15 = Mov GPRM4 11 LinkPGN 30
      Cmnd.16 = Comp GPRM3 != 29 Goto 18
      Cmnd.17 = Mov GPRM4 10 LinkPGN 29
      Cmnd.18 = Comp GPRM3 != 28 Goto 20
      Cmnd.19 = Mov GPRM4 9 LinkPGN 28
      Cmnd.20 = Comp GPRM3 != 27 Goto 22
      Cmnd.21 = Mov GPRM4 8 LinkPGN 27
      Cmnd.22 = Comp GPRM3 != 26 Goto 24

Fig. 15a

Cmnd.23 = Mov GPRM4 7 LinkPGN 26
Cmnd.24 = Comp GPRM3 != 25 Goto 26
Cmnd.25 = Mov GPRM4 6 LinkPGN 25
Cmnd.26 = Comp GPRM3 != 24 Goto 28
Cmnd.27 = Mov GPRM4 10 LinkPGN 24
Cmnd.28 = Comp GPRM3 != 23 Goto 30
Cmnd.29 = Mov GPRM4 9 LinkPGN 23
Cmnd.30 = Comp GPRM3 != 22 Goto 32
Cmnd.31 = Mov GPRM4 8 LinkPGN 22
Cmnd.32 = Comp GPRM3 != 21 Goto 34
Cmnd.33 = Mov GPRM4 7 LinkPGN 21
Cmnd.34 = Comp GPRM3 != 20 Goto 36
Cmnd.35 = Mov GPRM4 6 LinkPGN 20
Cmnd.36 = Comp GPRM3 != 19 Goto 38
Cmnd.37 = Mov GPRM4 5 LinkPGN 19
Cmnd.38 = Comp GPRM3 != 18 Goto 40
Cmnd.39 = Mov GPRM4 9 LinkPGN 18
Cmnd.40 = Comp GPRM3 != 17 Goto 42
Cmnd.41 = Mov GPRM4 8 LinkPGN 17
Cmnd.42 = Comp GPRM3 != 16 Goto 44
Cmnd.43 = Mov GPRM4 7 LinkPGN 16
Cmnd.44 = Comp GPRM3 != 15 Goto 46
Cmnd.45 = Mov GPRM4 6 LinkPGN 15
Cmnd.46 = Comp GPRM3 != 14 Goto 48
Cmnd.47 = Mov GPRM4 5 LinkPGN 14
Cmnd.48 = Comp GPRM3 != 13 Goto 50
Cmnd.49 = Mov GPRM4 4 LinkPGN 13
Cmnd.50 = Comp GPRM3 != 12 Goto 52
Cmnd.51 = Mov GPRM4 8 LinkPGN 12
Cmnd.52 = Comp GPRM3 != 11 Goto 54
Cmnd.53 = Mov GPRM4 7 LinkPGN 11
Cmnd.54 = Comp GPRM3 != 10 Goto 56
Cmnd.55 = Mov GPRM4 6 LinkPGN 10
Cmnd.56= Comp GPRM3 != 9 Goto 58
Cmnd.57 = Mov GPRM4 5 LinkPGN 9
Cmnd.58 = Comp GPRM3 != 8 Goto 60
Cmnd.59 = Mov GPRM4 4 LinkPGN 8
Cmnd.60 = Comp GPRM3 != 7 Goto 62
Cmnd.61 = Mov GPRM4 3 LinkPGN 7
Cmnd.62 = Comp GPRM3 != 6 Goto 64
Cmnd.63 = Mov GPRM4 7 LinkPGN 6

Fig. 15b

```
Cmnd.64 = Comp GPRM3 != 5 Goto 66                          ╱─ 84
Cmnd.65 = Mov GPRM4 6 LinkPGN 5
Cmnd.66 = Comp GPRM3 != 4 Goto 68
Cmnd.67 = Mov GPRM4 5 LinkPGN 4
Cmnd.68 = Comp GPRM3 != 3 Goto 70
Cmnd.69 = Mov GPRM4 4 LinkPGN 3
Cmnd.70 = Comp GPRM3 != 2 Goto 72
Cmnd.71 = Mov GPRM4 3 LinkPGN 2
Cmnd.72 = Comp GPRM3 != 1 Goto 74
Cmnd.73 = Mov GPRM4 2 LinkPGN 1
Cmnd.74 = Goto 1                           # Illegal value, pick again
                                                                ╱─ 104
PGC.2
    Post Command
106 ─► Cmnd.1 = Comp GPRM5 == 1 Goto 4      # If Player 1's turn go to line 4
       Cmnd.2 = Comp GPRM5 == 2 Goto 10     # If Player 2's turn go to line 10
       Cmnd.3 = LinkPGCN 2                  # If illegal value, start over
       Cmnd.4 = Mov GPRM5 2                 # Change to Player 2's turn
107 ─► Cmnd.5 = ADD GPRM1 GPRM4             # Add roll value to Player 1's current position and
                                            # set Player 1's new position - store back into GPRM1
118 ─► Cmnd.6 = Comp GPRM1 > 20 Goto 8      # Check if Player 1's position is greater than 20
       Cmnd.7 = LinkPGCN 3
       Cmnd.8 = SUB GPRM1 20                # Subtract 20 to get proper board position for Player 1
120 ─► Cmnd.9 = LinkPGCN 3
108 ─► Cmnd.10 = Mov GPRM5 1                # Change to Player 1's turn
110 ─► Cmnd.11 = ADD GPRM2 GPRM4            # Add roll value to Player 2's current position and
                                            # set Player 2's new position - store back into GPRM2
122 ─► Cmnd.12 = Comp GPRM2 > 20 Goto 14    # Check if Player 2's position is greater than 20
       Cmnd.13 = LinkPGCN 3
       Cmnd.14 = SUB GPRM2 20               # Subtract 20 to get proper board position for Player 2
124 ─► Cmnd.15 = LinkPGCN 3
```

Fig. 15c

PGC.3  ⟵ 126
  Pre Command
  Cmnd.1 = Comp GPRM1 == 1 LinkPGCN 4     # Content PGC where Player 1 is in board position "1"
  Cmnd.2 = Comp GPRM1 == 2 LinkPGCN 5     # Content PGC where Player 1 is in board position "2"
  Cmnd.3 = Comp GPRM1 == 3 LinkPGCN 6     # Content PGC where Player 1 is in board position "3"
  Cmnd.4 = Comp GPRM1 == 4 LinkPGCN 7     # Content PGC where Player 1 is in board position "4"
  Cmnd.5 = Comp GPRM1 == 5 LinkPGCN 8     # Content PGC where Player 1 is in board position "5"
  Cmnd.6 = Comp GPRM1 == 6 LinkPGCN 9     # Content PGC where Player 1 is in board position "6"
  Cmnd.7 = Comp GPRM1 == 7 LinkPGCN 10     # Content PGC where Player 1 is in board position "7"
  Cmnd.8 = Comp GPRM1 == 8 LinkPGCN 11     # Content PGC where Player 1 is in board position "8"
  Cmnd.9 = Comp GPRM1 == 9 LinkPGCN 12     # Content PGC where Player 1 is in board position "9"
  Cmnd.10 = Comp GPRM1 == 10 LinkPGCN 13     # Content PGC where Player 1 is in board position "10"
  Cmnd.11 = Comp GPRM1 == 11 LinkPGCN 14     # Content PGC where Player 1 is in board position "11"
  Cmnd.12 = Comp GPRM1 == 12 LinkPGCN 15     # Content PGC where Player 1 is in board position "12"
  Cmnd.13 = Comp GPRM1 == 13 LinkPGCN 16     # Content PGC where Player 1 is in board position "13"
  Cmnd.14 = Comp GPRM1 == 14 LinkPGCN 17     # Content PGC where Player 1 is in board position "14"
  Cmnd.15 = Comp GPRM1 == 15 LinkPGCN 18     # Content PGC where Player 1 is in board position "15"
  Cmnd.16 = Comp GPRM1 == 16 LinkPGCN 19     # Content PGC where Player 1 is in board position "16"
  Cmnd.17 = Comp GPRM1 == 17 LinkPGCN 20     # Content PGC where Player 1 is in board position "17"
  Cmnd.18 = Comp GPRM1 == 18 LinkPGCN 21     # Content PGC where Player 1 is in board position "18"
  Cmnd.19 = Comp GPRM1 == 19 LinkPGCN 22     # Content PGC where Player 1 is in board position "19"
  Cmnd.20 = Comp GPRM1 == 20 LinkPGCN 23     # Content PGC where Player 1 is in board position "20"

Post Command
  --- None ---

Fig. 15d

PGC.4 - PGC.23  # All PGC's have same navigation commands, but have different audio/video content Pre Command
Cmnd.1 = Comp GPRM2 == 1 LinkPGN 1
Cmnd.2 = Comp GPRM2 == 2 LinkPGN 2
Cmnd.3 = Comp GPRM2 == 3 LinkPGN 3
Cmnd.4 = Comp GPRM2 == 4 LinkPGN 4
Cmnd.5 = Comp GPRM2 == 5 LinkPGN 5
Cmnd.6 = Comp GPRM2 == 6 LinkPGN 6
Cmnd.7 = Comp GPRM2 == 7 LinkPGN 7
Cmnd.8 = Comp GPRM2 == 8 LinkPGN 8
Cmnd.9 = Comp GPRM2 == 9 LinkPGN 9
Cmnd.10 = Comp GPRM2 == 10 LinkPGN 10
Cmnd.11 = Comp GPRM2 == 11 LinkPGN 11
Cmnd.12 = Comp GPRM2 == 12 LinkPGN 12
Cmnd.13 = Comp GPRM2 == 13 LinkPGN 13
Cmnd.14 = Comp GPRM2 == 14 LinkPGN 14
Cmnd.15 = Comp GPRM2 == 15 LinkPGN 15
Cmnd.16 = Comp GPRM2 == 16 LinkPGN 16
Cmnd.17 = Comp GPRM2 == 17 LinkPGN 17
Cmnd.18 = Comp GPRM2 == 16 LinkPGN 16
Cmnd.19 = Comp GPRM2 == 19 LinkPGN 19
Cmnd.20 = Comp GPRM2 == 20 LinkPGN 20

Post Command
--- None ---

Fig. 15e

RANDOM SELECTION PROGRAM FOR AN OPTICAL DISC AND RELATED METHOD

CROSS-REFERENCE TO RELATED APPLICATION

Priority is claimed under 35 U.S.C. §119(e) to U.S. Provisional Patent Application No. 60/469,671, filed on May 12, 2003, entitled "Random Selection Device For An Optical System" by Bradley Thomas Collar and Lewis Ostrover, which application is incorporated by reference herein.

BACKGROUND OF THE INVENTION

1. Field of the Invention

The invention relates generally to the field of multimedia programming/authoring. In particular, the invention relates to authoring a DVD Video/ROM disc for playback on a conventional DVD video set top player and TV.

2. Description of Related Art

Interactive games featuring animated dice or spinner devices have been created for execution on personal computers or smaller hand-held game devices, e.g., a Nintendo Gameboy. However, if a user were to play a game stored on a DVD Video/ROM disc with the content executed on a conventional DVD player (i.e., an embedded consumer electronics device), and if that game required the use of a selection device (e.g., dice or a spinner), the selection device would not reside on the DVD or DVD/player system. Specifically, the user would have to use a physical die, dice, spinner, or other external selection device to make the relevant selections in the game.

Moreover, if a competitive position representation were to be desired, e.g., game pieces located on a board, for example, the game pieces used in the following board games; Trivial Pursuit, Monopoly, Clue, Chess, Checkers, Go, etc., then an external (i.e., apart from the DVD/player/TV/display system) board would be required. For example, the recently released Scene It game employs a DVD, a conventional DVD player and associated display with a physical die and a physical board to accomplish the selections and player position representation previously mentioned.

Accordingly, there is a need for an interactive game that is stored on a DVD Video/ROM disc and played on a conventional DVD video player, and that accomplishes selection and player position representations, without requiring an external selection device and/or an external competitive position representation. The present invention satisfies these needs.

SUMMARY OF THE INVENTION

Embodiments of the present invention include a random selection program stored on an optical disc that is played on an electronic device. The electronic device is coupled to an audio/visual output device. The electronic device includes a random number generator. The random selection program includes a random selection module and a program selector module. The random selection module is programmed to initiate the random number generator to generate randomly a selection. The program selector module is programmed to receive the selection and to initiate an audio/visual presentation that corresponds to the selection on the audio/visual output device.

In other, more detailed features of the invention, the optical disc is a DVD video disc, and the electronic device is a DVD player. Also, the selection is selected from the group consisting of a number, a letter, a word, and a symbol. In addition, the random selection program is programmed to generate the selection independent of a prior selection, or the random selection program is programmed to generate the selection conditionally based on a prior selection.

In other, more detailed features of the invention, the audio/visual presentation is selected from the group consisting of a die, dice, a ball, balls, and a spinner. Also, the audio/visual presentation is selected from the group consisting of a sound effect, sound effects, a musical note, musical notes, and dialogue.

In other, more detailed features of the invention, the audio/visual output device is configured to be viewed by a user, and the program selector module is programmed to initiate the display of a button on the audio/visual output device when the random selection program is ready to generate the selection. The user can select the button to initiate the random number generator to generate the selection. Also, an event that occurs during the playing of the optical disc can automatically initiate the random selection program to generate the selection.

Another exemplary embodiment of the invention is a random selection program stored in an optical disc, which is played on an electronic device. The electronic device is coupled to an audio/visual output device. The electronic device includes a random number generator that randomly generates a selection, where the selection is a random number. The electronic device includes a parameter register, which is configured to store the random number. The random selection program includes a comparison module, a decrementor module, and a minimum value check module. The comparison module is programmed to compare the random number stored in the parameter register to a predetermined integer. The decrementor module is linked to the comparison module and programmed to decrement the predetermined integer by one, resulting in a decremented integer, when the random number stored in the parameter register does not equal the predetermined integer. The minimum value check module is linked between the decrementor module and the comparison module and programmed to verify that the decremented integer is not zero. If the decremented integer is equal to zero, then the random selection program initiates the random number generator to generate another random number. If the decremented integer is not equal to zero, then the comparison module compares the decremented integer to the random number stored in the parameter register. The program selector program is programmed to initiate an audio/visual presentation corresponding to the random number on the audio/visual output device when the random number equals the predetermined integer or the decremented integer.

In other, more detailed features of the invention, the random number generator generates a random integer ranging in value from 1 to S+1, where S is an integer. The random integer is stored in the parameter register. The comparison module is programmed to compare the random integer stored in the parameter register to the predetermined integer. The predetermined integer ranges in value from 1 to S.

In other, more detailed features of the invention, the comparison module increments a counter variable stored in the parameter register when the random number equals the previous random number generated by the random number generator. An error message is displayed on the audio/visual output device when the counter variable exceeds a preset threshold value.

In other, more detailed features of the invention, the random selection program also includes a program selector module, a mode check module, a random selection module, and a conditional check module. The program selection module is programmed to receive the selection and to initiate an audio/ visual presentation that corresponds to the selection. The mode check module is linked between the comparison module and the program selector module and is programmed to check whether the random selection program is operating in an independent mode or a conditional mode. The random selection module is programmed to initiate the random number generator to generate randomly the selection. The conditional check module is linked between the mode check module and the random selection module and is programmed to check whether the random number output from the random selection module has been selected previously when the random selection program is operating in the conditional mode. When the random selection program is operating in the conditional mode, the random selection module initiates the random number generator to generate another random number if the random number has been selected previously.

Another exemplary embodiment of the invention is a game program stored on an optical disc, which is played on an electronic device. The electronic device is coupled to an audio/visual output device. The electronic device includes a random number generator. Game images resulting from the game program are displayed on the audio/visual output device. The game program includes a random selection module and a program selector module. The random selection module is programmed to initiate the random number generator to generate randomly a selection. The program selector module is programmed to receive the selection and to initiate an audio/visual presentation that corresponds to the selection on the audio/visual output device.

Another exemplary embodiment of the invention is a game program stored on an optical disc, which is played on an electronic device. The electronic device is coupled to an audio/visual output device. The electronic device includes a random number generator that randomly generates a selection, where the selection is a random number. The electronic device includes a parameter register, which is configured to store the random number. The game program includes a comparison module, a decrementor module, and a minimum value check module. The comparison module is programmed to compare the random number stored in the parameter register to a predetermined integer. The decrementor module is linked to the comparison module and programmed to decrement the predetermined integer by one, resulting in a decremented integer, when the random number stored in the parameter register does not equal the predetermined integer. The minimum value check module is linked between the decrementor module and the comparison module and programmed to verify that the decremented integer is not zero. If the decremented integer is equal to zero, then the game program initiates the random number generator to generate another random number. If the decremented integer is not equal to zero, then the comparison module compares the decremented integer to the random number stored in the parameter register. The game program is programmed to initiate an audio/visual presentation corresponding to the random number on the audio/visual output device when the random number equals the predetermined integer or the decremented integer.

In other, more detailed features of the invention, the audio/visual output device is configured to be viewed by a user, and the game images include a competitive position representation that indicates the user's current position on the audio/visual output device. Also, the program selector module includes a position calculator module programmed to calculate a new position for the user based on the user's current position and the selection. The competitive position representation on the audio/visual output device is automatically updated to reflect the user's new position. Also, the program selector module further includes a maximum position check module and a position correction module. The maximum position check module is programmed to determine whether the user's new position exceeds a maximum position value. The position correction module is programmed to correct the user's new position if the user's new position exceeds the maximum position value.

Another exemplary embodiment of the invention is a game program stored on an optical disc, which is played on an electronic device. The electronic device is coupled to an audio/visual output device. The electronic device includes a random number generator. Game images resulting from the game program are displayed on the audio/visual output device. The game program includes a first subroutine and a second subroutine. The first subroutine is programmed to initiate the random number generator to generate a selection. The second subroutine is programmed to initiate an audio/visual presentation that corresponds to the selection on the audio/visual output device.

In other, more detailed features of the invention, the audio/visual output device is configured to be viewed by a user, and the first subroutine is programmed to initiate the display of a start button that is displayed on the audio/visual output device when the game program is ready to generate the selection, and the user can select the start button to initiate the random number generator to generate the selection.

An exemplary method that embodies the invention is a method for generating a random selection in conjunction with an optical disc played on an electronic device, which is coupled to an audio/visual output device. The method includes randomly generating a selection, and initiating an audio/visual presentation that corresponds to the selection on the audio/visual output device.

Other features of the invention should become apparent from the following description of the preferred embodiments taken in conjunction with the accompanying drawings, which illustrate, by way of example, the principles of the invention.

BRIEF DESCRIPTION OF THE DRAWINGS

FIGS. 9a through 9h are a listing of logical code used to implement the random selection program in conditional mode.

FIG. 13 is a roll value table for the example of FIGS. 11 and 12, which is used to translate a random number (e.g., dice roll) into the appropriate value to move a player piece on the game board depicted in FIG. 10.

FIG. 15a through 15e are a listing of logical code used to implement the random selection program and competitive position representation for the example referenced in FIGS. 11 and 12.

DETAILED DESCRIPTION OF THE PREFERRED EMBODIMENTS

Figure 1:
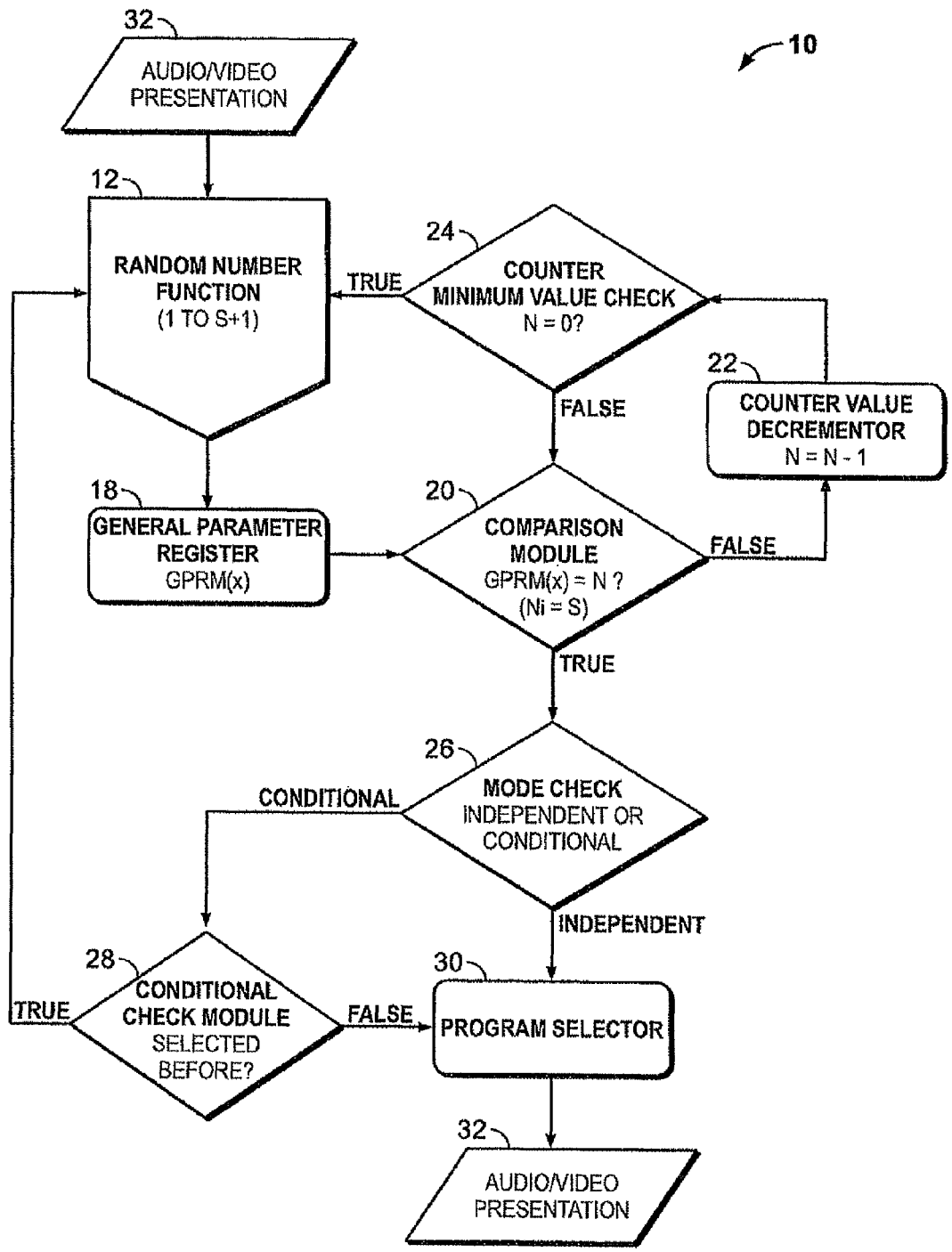
FIG. 1 is a block diagram of a random selection program according to a preferred embodiment of the present invention.

The present invention provides methods for authoring an optical disc to include a random selection program in tandem with a DVD player, i.e., an embedded consumer electronics device, which invokes random audio/visual presentations on an associated audio/visual output device, e.g., a monitor or display (e.g., TV screen) and/or audio output device (e.g., speakers) for use in the playing of a game. Also, a handheld or otherwise portable form factor could be used, e.g., a portable or handheld DVD player with screen and speakers or earphones. The audio/visual presentations include images, e.g., a die, dice, a ball, balls, or a spinner, and/or audio output, e.g., a sound effect, sound effects, a musical note, musical notes, or dialogue. The present invention also provides methods for authoring an optical disc to include a competitive position representation in tandem with the DVD player to output the audio/visual presentations in accordance with the aforementioned play results.

One way of making the user's gaming experience more seamless, and, thus more enjoyable, is to integrate a selection device into the content of the game, or presentation, in tandem with the conventional DVD player, display, and audio output device. That is, through the course of game play, information stored on the optical disc, along with the play of the game, would effect the relevant selections, and the results would appear visually on the user's monitor (or aurally from the user's speakers) in conjunction with the rest of the audiovisual content on the optical disc. Each random selection, e.g., a number, a letter, a word, and/or a symbol, is within a range of possible selections, and could be an independent selection (i.e., it would be possible to get the same selection more than once during the game). Examples of selection devices that operate via independent selection include; a die, dice, and a spinner.

For specific applications, it is useful for the selection device to pick subsequent random selections in a conditional fashion (e.g., once a number has been picked it would not be picked again). An example application is a bingo game, which includes simulated balls in a bingo hopper. As each selection ball is selected from the range, i.e., the hopper, it is not possible to get the same selection a second time within that bingo game. Therefore, a selection device can operate in two distinct modes: an independent mode that would make and present independent selections, and a conditional mode that would make and present a selection on the condition that it had not been selected before.

Another way to make the user's gaming experience more seamless is to integrate the players' competitive position representations into the content of the game in tandem with the conventional DVD player and display. No external board is required since the DVD player display (e.g., a TV screen) shows the competitive position result (either automatically as a result of each play, on demand as requested by a user control, or both). In order to implement this, both the selection and competitive position representation methods employ software that operates in accordance with the DVD Specifications for Read-Only Disc, Part 1: Physical Specifications, Part 2: File System Specifications, Part 3: Video Specifications, and all corresponding supplements, which are incorporated by reference herein. In addition, sufficient logical code (programming) and multimedia assets (e.g., audio/video bitstreams) are needed to implement this method, both to cause the generation of, and the presentation of, the aforementioned play selections and competitive position representations.

The present invention provides methods for authoring an optical disc to include a random selection program or method in tandem with a DVD player, which invokes random video/audio selection result presentations on the associated display in the form of, for example, a die, dice, a ball, balls, or a spinner for use in the playing of a game. The present invention also provides methods for authoring an optical disc to include a competitive position representation in tandem with an embedded player (i.e., a DVD player) to show the representation on the associated display or audio output in accordance with the aforementioned play results.

During the course of normal playback of a multimedia presentation or game, the user may select a button, or start image, that triggers, or initiates, the random selection. The random selection program may also be executed automatically following an event that occurs during the playing of the DVD disc (e.g., the random selection executes automatically after an audio/video presentation finishes playing).

FIG. 1 is a block diagram, which illustrates the basic flow for a random selection program and method 10 according to an embodiment of the present invention. Each of the individual blocks can be programmed and implemented using programming code, e.g., DVD syntax, and multimedia assets, e.g., still images, animated images, audio, video, and subtitles, stored on the optical disc as detailed in the DVD Specifications for Read-Only Disc, Part 1: Physical Specifications, Part 2: File System Specifications, Part 3: Video Specifications, and all corresponding supplements. The code/multimedia assets will be executed/played on an embedded consumer electronics device (e.g., DVD player) that is compliant with DVD Specifications for Read-Only Disc, Part 1: Physical Specifications, Part 2: File System Specifications, Part 3: Video Specifications, and all corresponding supplements.

In embodiments of the invention, the random selection program is programmed using commands specified in the DVD Specification for Read-Only Disc, Part 3: Video Specifications, and illustrations of the program are instantiated by a Toshiba DVD authoring tool (hereinafter noted as "DVD syntax"). This does not preclude the use of a different DVD authoring tool that uses a different abstraction layer of the specifications.

The first module, or first subroutine, in the random selection program is the random selection module 12, which triggers, or initiates, the generation of a random integer number between the number 1 and the number S+1, where S is a finite integer number denoting the total number of possible selections. Examples of the code used for this module are listed in Cmnd.1 14 of FIG. 6 and Cmnd.4 16 of FIG. 9a. In all cases, the random number function invokes the random number generator (not shown), or pseudo random number generator, of the DVD playback device (not shown). The random number generator, or pseudo random number generator, generates randomly, or pseudo randomly (hereafter "randomly"), a selection. The random number function is defined in the DVD Video Specifications for Ready-Only Disc, Part 3: Video Specifications, section 4.6—Navigation Commands and Navigation Parameters, to generate a randomly selected value between the range of 1 and R, where R is the upper bound in the range of possibilities that is specified by the programming code.

The random number is stored in a memory module denoted as a general parameter register 18 in FIG. 1. Current DVD players have sixteen general parameter registers, with each register containing sixteen bits of memory. However, the method of this invention is not limited to devices containing only sixteen general parameter registers and/or registers containing more or less than sixteen bits of memory. The only limitation is that the number of possible selections fit into the register. Specifically, if a general parameter register contains B bits, it is a requirement that $S \leq 2^B$. In FIG. 1, the general parameter register is shown as GPRM(x), where x indicates the specific general parameter register being used.

The next step is for a comparison module 20 to compare the random number stored in general parameter register 18, GPRM(x), with a predetermined integer N, which has an initial value $N_i$ equal to the value S. In the case where the comparison module yields a mismatch, a loop operation is performed. The first block of the loop operation is the counter value decrementor module 22, which decrements the value of N by one. Thus, resulting in the decremented integer, N, which equals the initial value N minus one. The random function is invoked intentionally to generate a random number between 1 and S+1, but only checking for values between 1 and S to account for known models of DVD players (not shown) that interpret the random function incorrectly. These incompatible DVD players instantiate the random function to generate a random value between 0 and R−1, instead of the intended range of 1 to R. For example, if the programming code specifies RND GPRM(x) 6, the incompatible DVD player will generate a random value between 0 and 5, instead of the intended range of 1 to 6. In the context of using such a function to generate the value of a roll of a die (not shown), the die side corresponding to the value 6 would never be selected on the incompatible DVD player, thus seriously impacting the user's experience. Therefore, a work around for this known fault is to set the upper bound to a value of R+1 and then declare the values from 1 to R to be the only valid values.

The second module of the loop operation is the counter minimum value check module 24, where the new value of N is compared against the number 0. If N does not equal 0, execution returns to the comparison module 20 to perform another comparison between GPRM(x) and the newer value of N. If N equals zero, the random value is disallowed and execution starts over at the random selection module 12, with all variables being initialized.

In the case where the comparison module 20 yields a match, execution proceeds to the mode check module 26. The mode check module determines whether the random selection module 12 will pick independent numbers (allow the same selection to be made more than once), or conditional numbers (do not allow the same selection twice). However, since the person authoring the optical disc (not shown) may not know if the application requires the random selection program 10 to be operating in independent or conditional mode, the mode check module may or may not be implemented in programming code. That is, if it is already known that the specific application requires the selection program to always operate in the independent mode, it is not necessary to perform the mode check, and, thus it is not necessary to include a conditional check module 28 (discussed later in this document) in the software stored on the disc. In fact, the elimination of the corresponding code results in a more efficient, and easier to debug, program.

If the selection program 10 is operating in independent mode, then the program will proceed to the program selector module 30, or second subroutine, which executes the appropriate navigation command to display the audio/video bitstream corresponding to the random selection to represent the result. For example, if the random selection was the number 4, and the application was a die (not shown), the program selector module would execute the navigation command to select the program chain (PGC) and program (PG) containing the cells consisting of audio/video showing a die rolling a number 4 in the audio/video presentation, or audio/visual presentation, 32 on the display (not shown).

Figure 2:
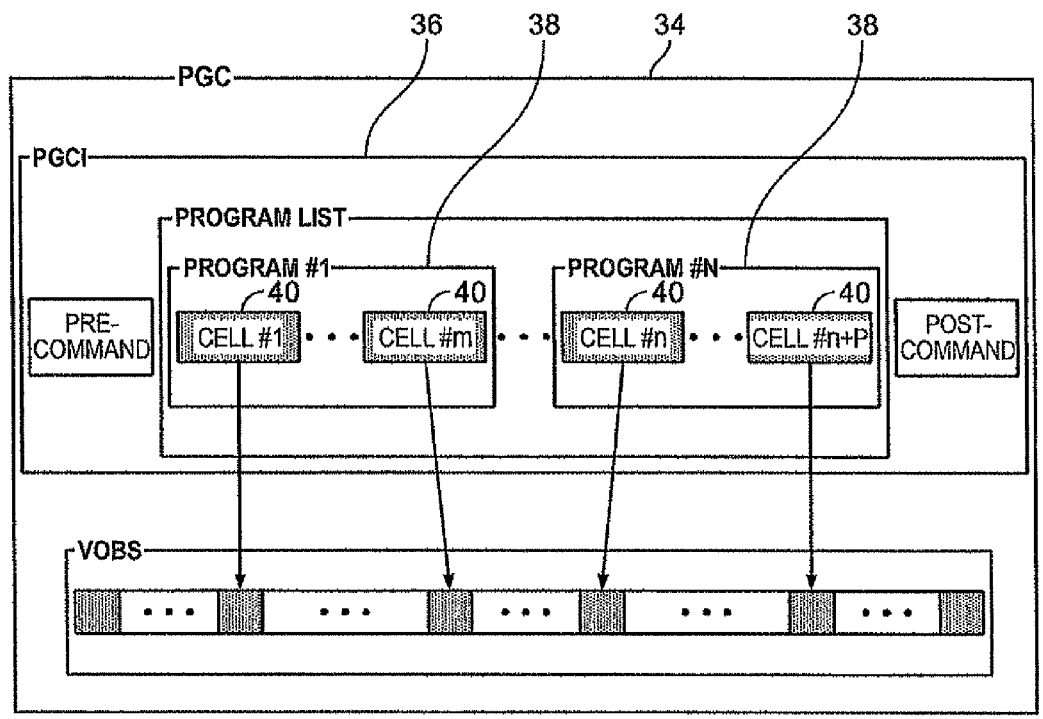
FIG. 2 is a block diagram representation of the structure of a DVD program chain ("PGC").

FIG. 2 is a block diagram representation of a program chain 34. A program chain is defined in the DVD Specifications for Read-Only Disc, Part 3: Video Specifications, section 2.4—Terminology, as "the logical unit to present a part of or the entire Title or Menu" and "composed of the PGC Information (PGCI) on which the order and the essence of the presentation are described and one or more Cells to be presented." The program (PG) is defined as "the unit to divide the contents of the PGC. One PGC may be divided into integer number of PGs. One PG shall be composed of integer number of Cells." A cell is defined as "the basic unit of the content to be presented," and contains the actual multimedia assets to be presented to the audio/video output of the DVD player. The program chain shown in FIG. 2 contains program chain information (PGCI) 36, which contains the navigation commands and the order of the program 38 and cell 40 playback.

Figure 3:
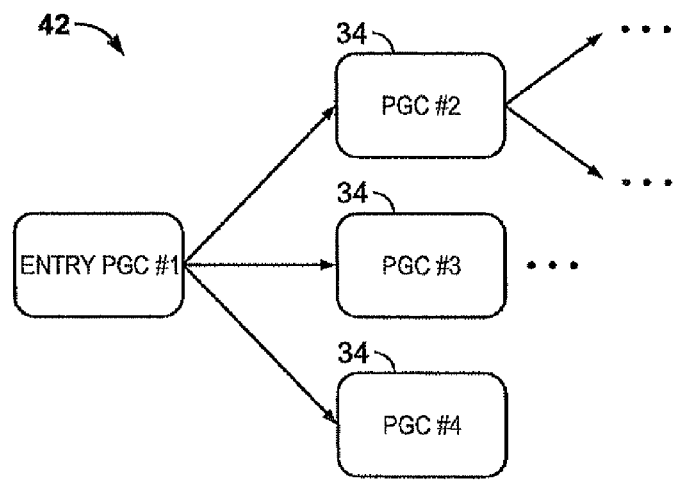
FIG. 3 is a block diagram representation of a multi-PGC title structure.

As noted above, a program chain 34 can present a part of, or the entire, Title (not shown). In the case where the program chain present only part of the Title, more than one chain is grouped together into a multi-PGC title structure 42, as shown in FIG. 3. When such a structure is employed, a single Title number will be played and may be shown on the DVD player's display (not shown), however, more than one program chain is accessed during the playing of that Title; hence it is a multi-PGC title.

Figure 4:
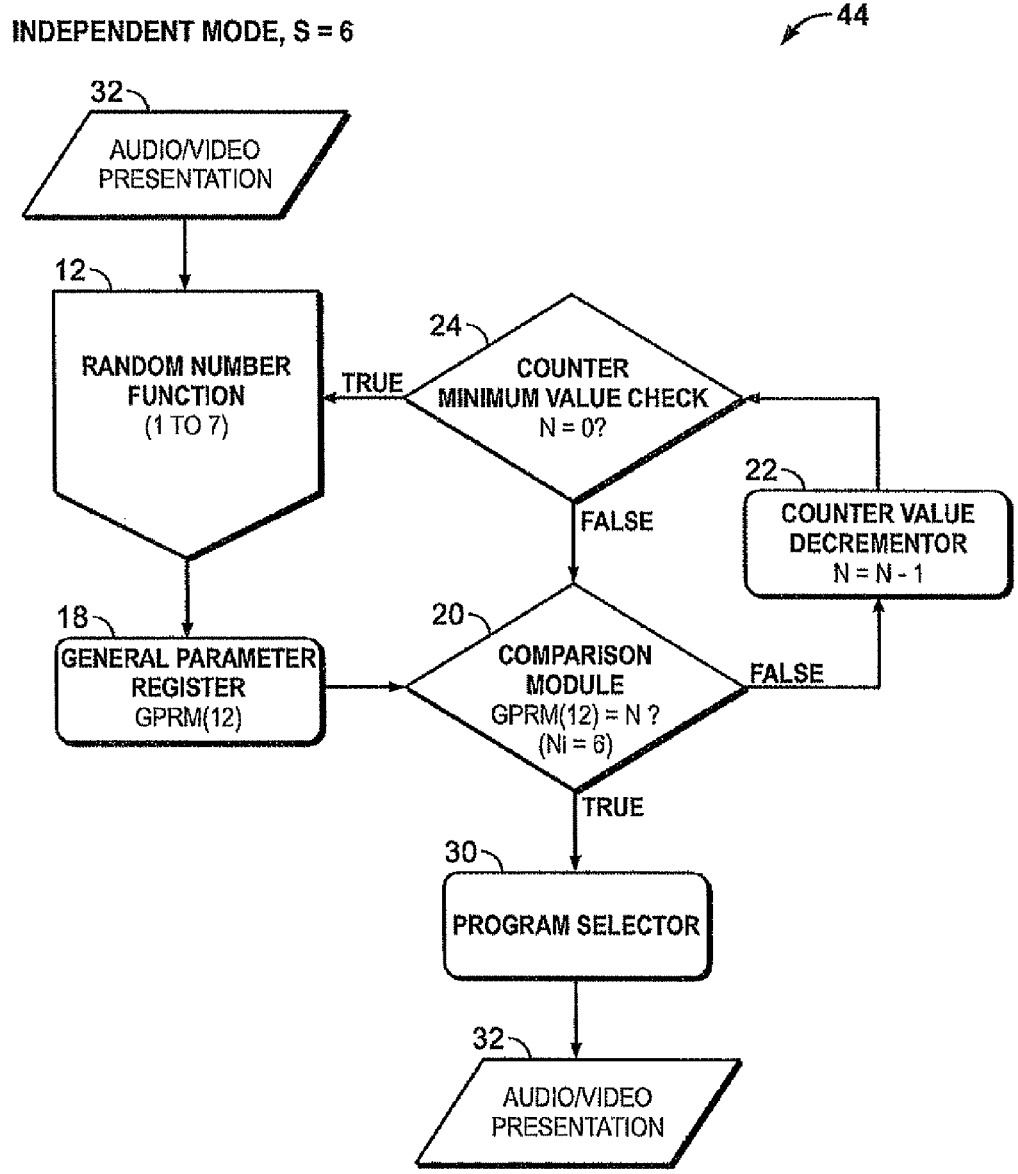
FIG. 4 is a block diagram of the random selection program in independent mode, with S=6, representing the six sides of a single die.

FIG. 4 is a block diagram of the random selection program 44 in independent mode, with S=6, representing the six sides of a single die (not shown). Upon selection of a button (not shown), or start image, the random selection module 12 triggers, or initiates, the generation of a random integer number between the number 1 and 7 (S+1, as previously shown in FIG. 1). The value is stored into GPRM(12) 18 and is compared against a predetermined integer N, with initial value $N_i$=6. In the case where the comparison performed in the comparison module 20 yields a mismatch, the value in GPRM (12) is decremented by one and forwarded to the counter minimum value check module 24 where it is compared against the number zero. If N does not equal zero, execution returns to the comparison module to perform another comparison between GPRM(12) and the newer value of N. If N equals zero, the random value is disallowed and the execution starts over at the random selection module, with all variables being initialized.

Figures 5, 6:
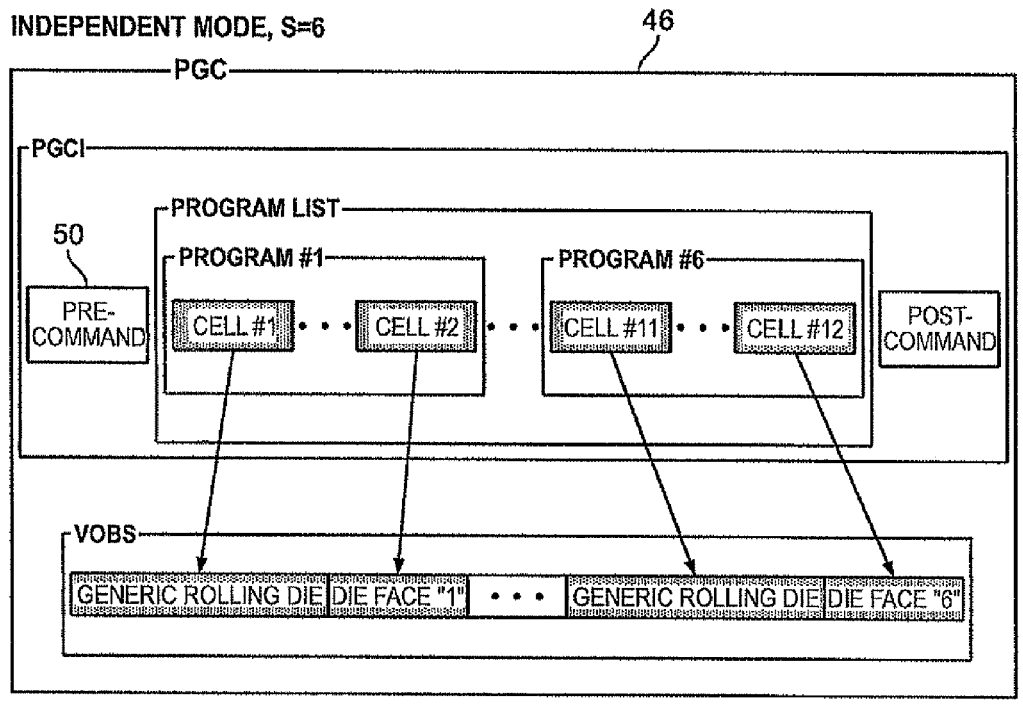
FIG. 5 is a block diagram representation of the PGC structure for the example of FIG. 4.
FIG. 6 is a listing of logical code used to implement the random selection program of FIG. 4.

In the case where the comparison module 20 yields a match between GPRM(12) 18 and N, execution proceeds to the program selector module 30, which triggers, or initiates, the display of the program corresponding to the value of GPRM (12). For example, when the value of GPRM(12) is 6, the program selector module will trigger the display of program number 6 within the current program chain 46, which contains audio/video of a rolling die and subsequent die face with the value of 6, as indicated in FIG. 5. The DVD syntax representation of FIG. 4 is shown in PGC.1 48 of FIG. 6 and resides in the Pre-Command area 50 of the program chain as shown in FIG. 5.

Referring again to FIG. 1, if the selection program 10 is operating in conditional mode, then the program will proceed to the conditional check module 28. The conditional check module will determine if the current selection has been selected at any time during the current DVD session (e.g., during the current bingo game). If the current selection has been selected previously, it will proceed back to the random selection module 12. If the current selection has not been selected previously, it will proceed to the program selector module 30.

Figure 7:
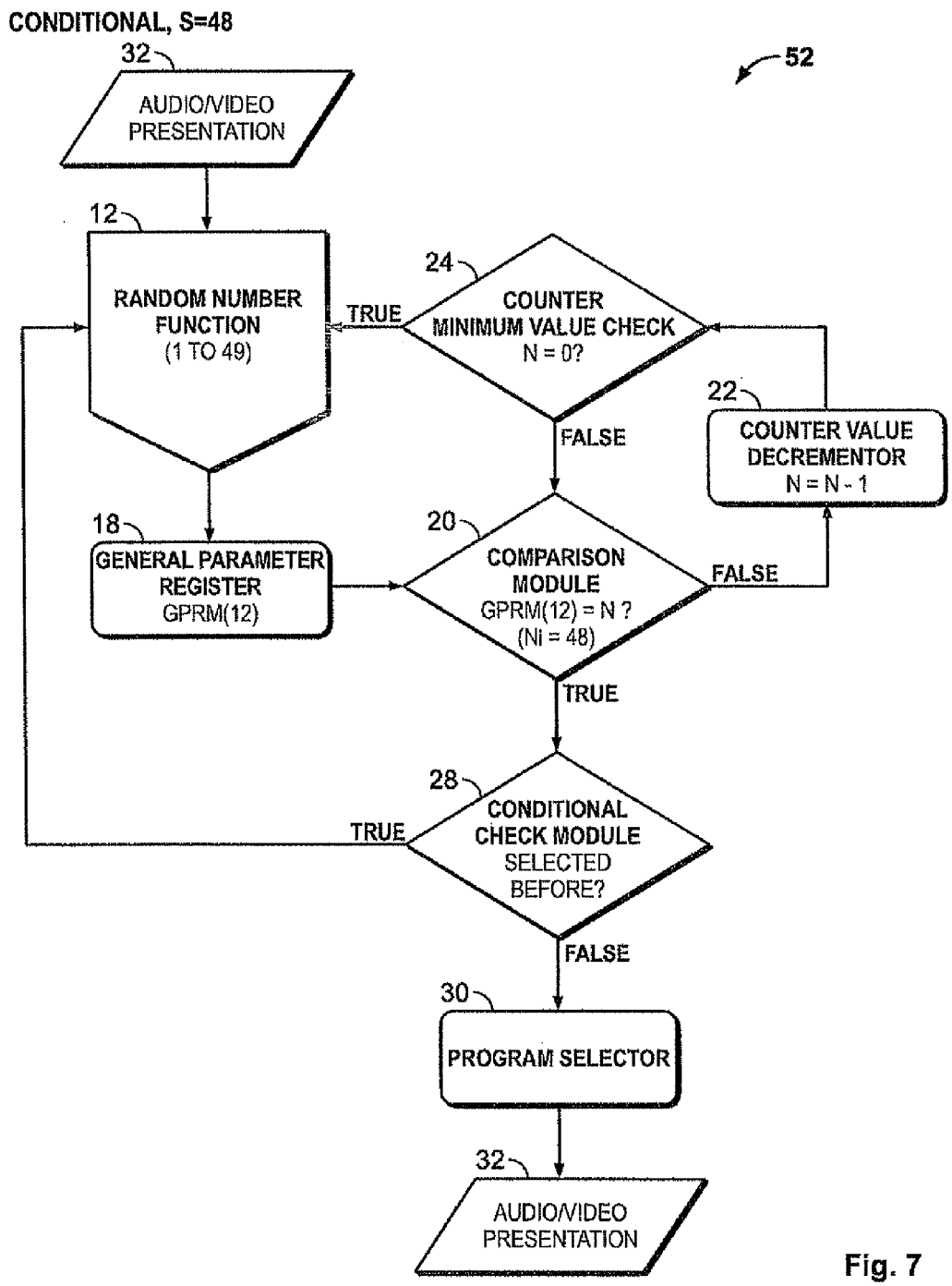
FIG. 7 is a block diagram of the random selection program in conditional mode, with S=48, representing 48 bingo balls numbered 1 to 48.

FIG. 7 is a block diagram of a random selection program 52 in conditional mode, with S=48, representing 48 bingo balls (not shown) number 1 to 48. Upon selection of a button (not shown), or start image, the random selection module 12 triggers, or initiates, the generation of a random integer number between the number 1 and 49 (S+1, as previously shown in FIG. 1), as indicated in PGC.1 Cmnd.4 16 of FIG. 9a. The value is stored into GPRM(12) 18 and is forwarded to the comparison module 20 where it is first compared against the previous random value that was selected, which is stored in GPRM(11) (not shown). For the first random value that is selected, the value of GPRM(11) is zero, because no previous random selections have been made. The DVD syntax of this comparison is shown in PGC.1 53 Cmnd.5 54 of FIG. 9a.

If the value of GPRM(12) 18 is equal to the value of GPRM(11) (not shown), then the value of the counter variable GPRM(10) (not shown) is incremented by one. GPRM(10) acts as a counter to determine the number of successive random selections in which the same random value is generated by the random selection module 12. If the counter variable, GPRM(10), exceeds the preset threshold of 65,500, then the DVD player (not shown) is determined to be incompatible and a navigation command is executed, which displays a program containing an audio/visual presentation 32 consisting of an error message (not shown) to the user. The purpose of including this counter operation is to account for certain incompatible DVD players that incorrectly return the same random value for each invocation of the DVD player's random number generator, thus causing an infinite loop to occur during playback and causing the DVD disc to "crash" to the DVD player. To avoid this infinite loop scenario, a workaround is employed as indicated in PGC.1 53 Cmnd.6 56 and Cmnd.7 58 of FIG. 9a.

If the value of GPRM(12) 18 is not equal to the value of GPRM(11) (not shown), then the new random number is stored into GPRM(11) for future random selections. In addition, the value of the counter variable, GPRM(10) (not shown), is reset to zero. The DVD syntax for these operations is shown in PGC.1 53 Cmnd.9 60 and Cmnd.10 62 of FIG. 9a.

Next, the value of GPRM(12) 18 is compared against a predetermined integer N, with initial value $N_i$=48. In the case where the comparison performed in the comparison module 20 yields a mismatch, the value in GPRM(12) is decremented by one and forwarded to the counter minimum value check module 24 where it is compared against the number zero. If N does not equal zero, execution returns to the comparison module to perform another comparison between GPRM(12) and the newer value of N. If N equals zero, the random value is disallowed, and the execution starts over at the random selection module with all variables being initialized.

Figure 8:
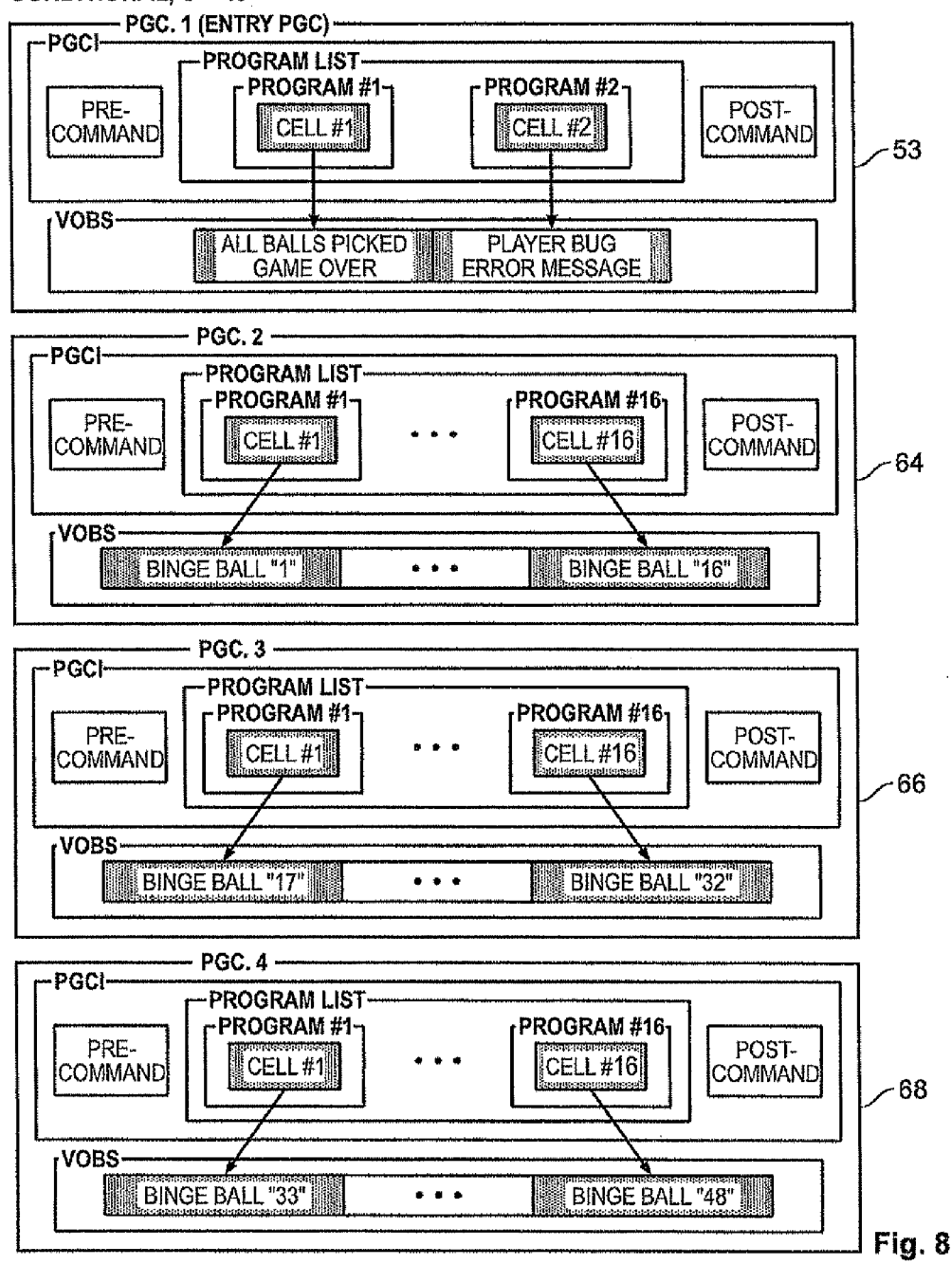
FIG. 8 is a block diagram representation of the multi-PGC title structure for the example of FIG. 7.

In the case where the comparison module 20 yields a match between GPRM(12) 18 and N, execution proceeds to the conditional check module 28 to determine if that value has been selected previously. If the value of GPRM(12) has been selected previously, then the program 52 will return to the random selection module 12 to trigger, or initiate, the generation of a new random integer. If the value of GPRM(12) has not been selected previously, then the program will proceed to the program selector module 30 to present the corresponding program chain 34 and program 38 containing the appropriate audio/visual presentation 32 corresponding to the selection, in this example, a bingo ball (not shown). The DVD syntax representing this portion of the comparison module and the conditional check module is shown in PGC.2 64, PGC.3 66, and PGC.4 68 of FIGS. 9a-9g (see also FIG. 8).

Figure 10:
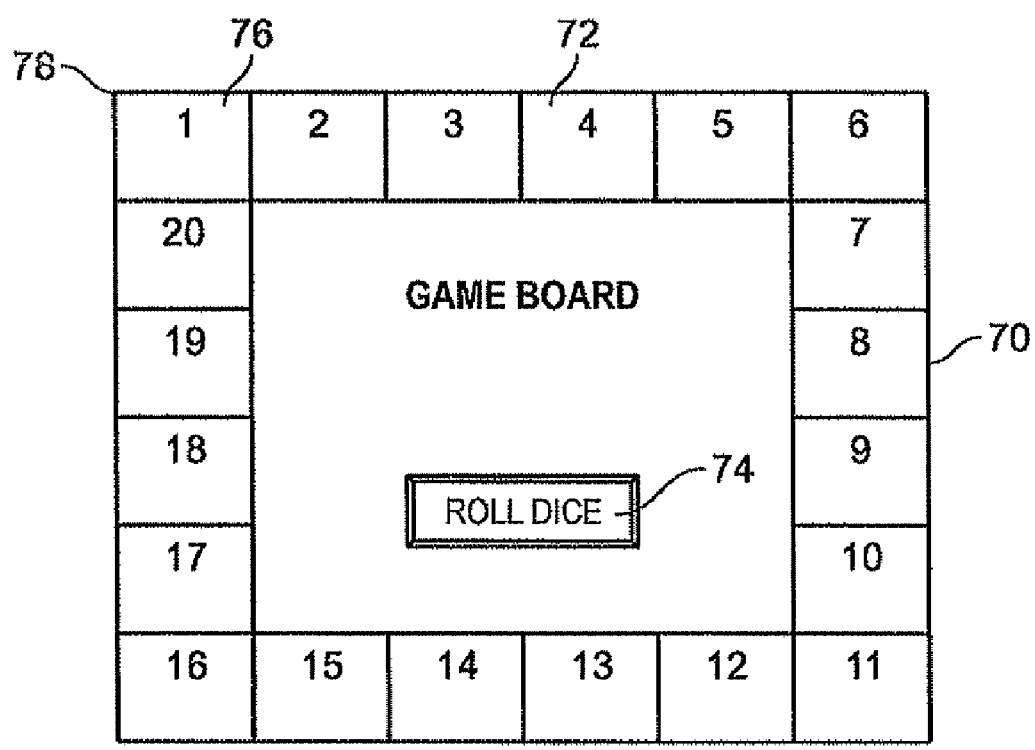
FIG. 10 is a top plan view of a competitive position representation, namely, a game board having 20 position spaces and a button to initiate rolling of dice.

The method of including a competitive position representation (e.g., board 70, see FIG. 10) on the disc (not shown) requires the program selector module 30 to include additional subroutines that determine which program (audio/video content) is to be displayed. First, the program selector module must determine which player's turn it is, and therefore, which player's position will change on the competitive position representation. Next, the program selector module determines the new position (not shown) of the designated player based on the selection. Finally, the program selector module automatically determines the program chain 34 and program to display the appropriate updated competitive position representation.

Figure 11:
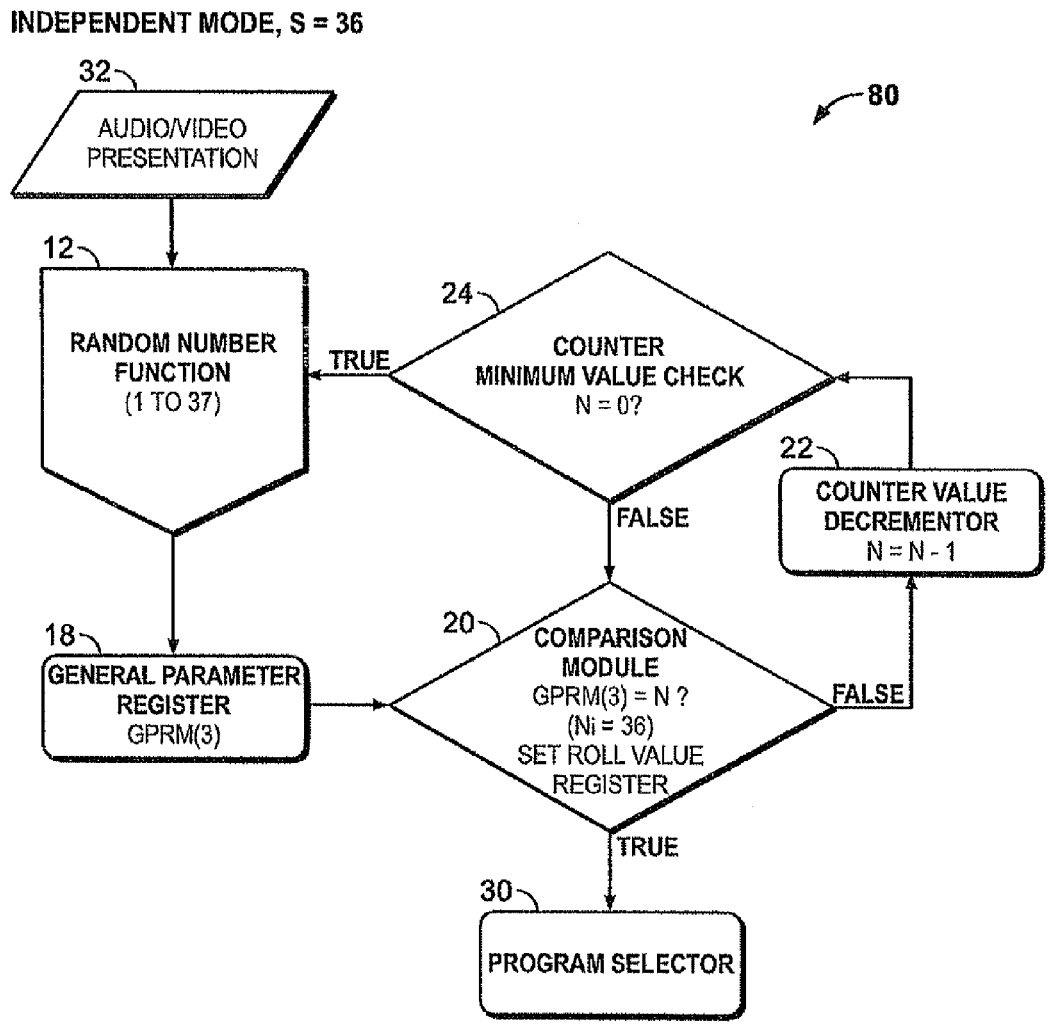
FIG. 11 is a block diagram of the random selection program in independent mode, with S=36, representing 36 different combinations of two dice.
Figure 14A:
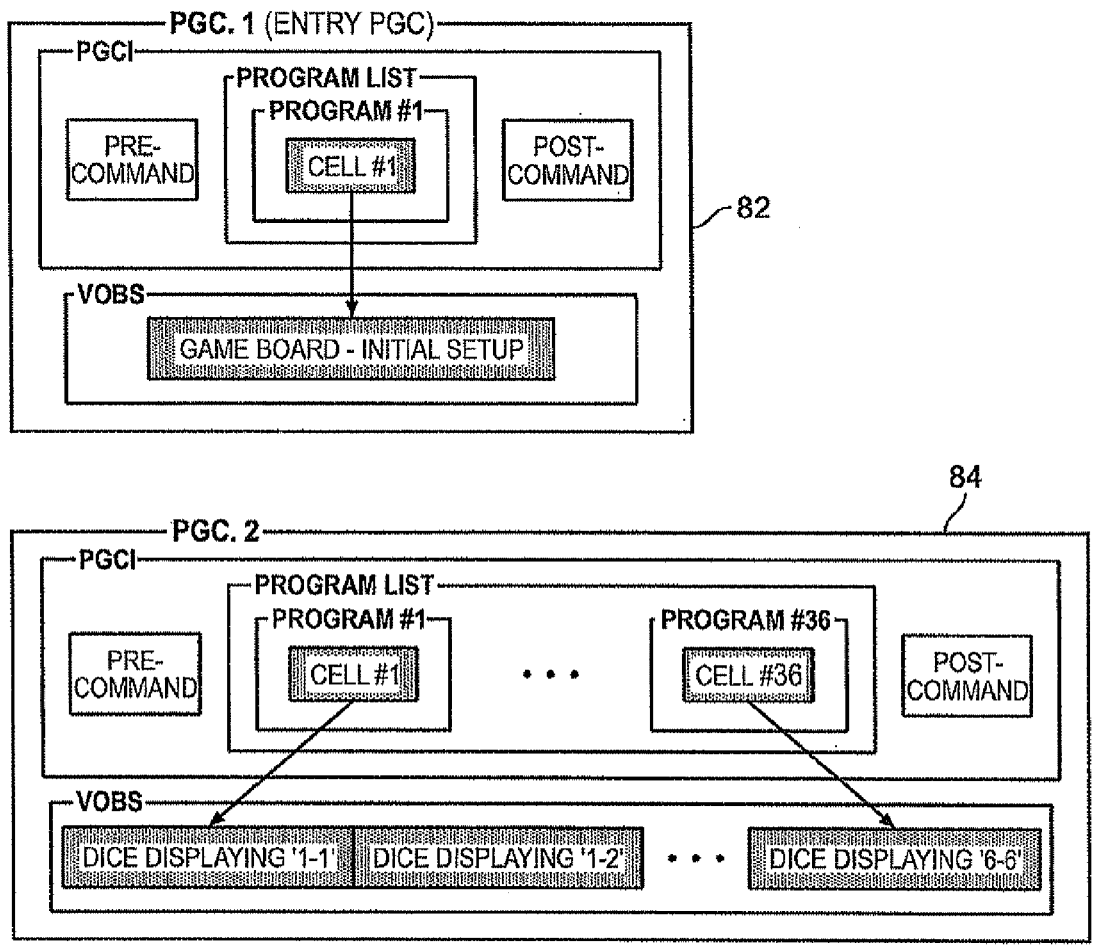
FIGS. 14a and 14b are block diagrams of the PGC structure for the example of FIGS. 11 and 12.

Since there are a wide variety of applications and variables for representing a competitive position (i.e., different board types, board size, number of players, etc.) it is illustrative to demonstrate this method via an example. Consider the case illustrated in FIG. 10, in which the competitive position representation is a game board 70, which is shown on the display (not shown), with twenty positional spaces 72 and a button 74, which when activated, rolls two dice (not shown) and updates the competitive positions of the players (not shown). It is also assumed that there are two players and that the game pieces (not shown) move in clockwise direction around the board. In such a case, the board positions would be designated 1 thru 20, with position 176 corresponding to the upper left hand corner 78 of the game board. Therefore, there would be 400 possible competitive positions (twenty positions for player 1 times twenty positions for player 2), with each competitive position represented by a single audio/video sequence/bitstream (static and/or animated) stored on the DVD disc (not shown). Similarly, there would be thirty-six dice roll representations stored on the disc, with each dice roll represented as a single audio/video sequence/bitstream (static and/or animated). The basic flowchart of the random selection program 80 for this example is shown in FIG. 11. Note that since it is possible to get the same dice roll more than once, the random selection program is operating in independent mode. In addition, in the comparison module 20, the value of each dice roll is stored into a general parameter register 18 for later use in the program selector module 30. The DVD syntax representation of FIG. 11 (excluding the program selector module) is shown in PGC.1 82 and the Pre-Command of PGC.2 84 shown in FIGS. 15a-15c. In addition, the block diagram of these program chains 34, which include the logical positions of each audio/video presentation 32, are shown in PGC.1 and PGC.2 of FIG. 14a.

Figure 12:
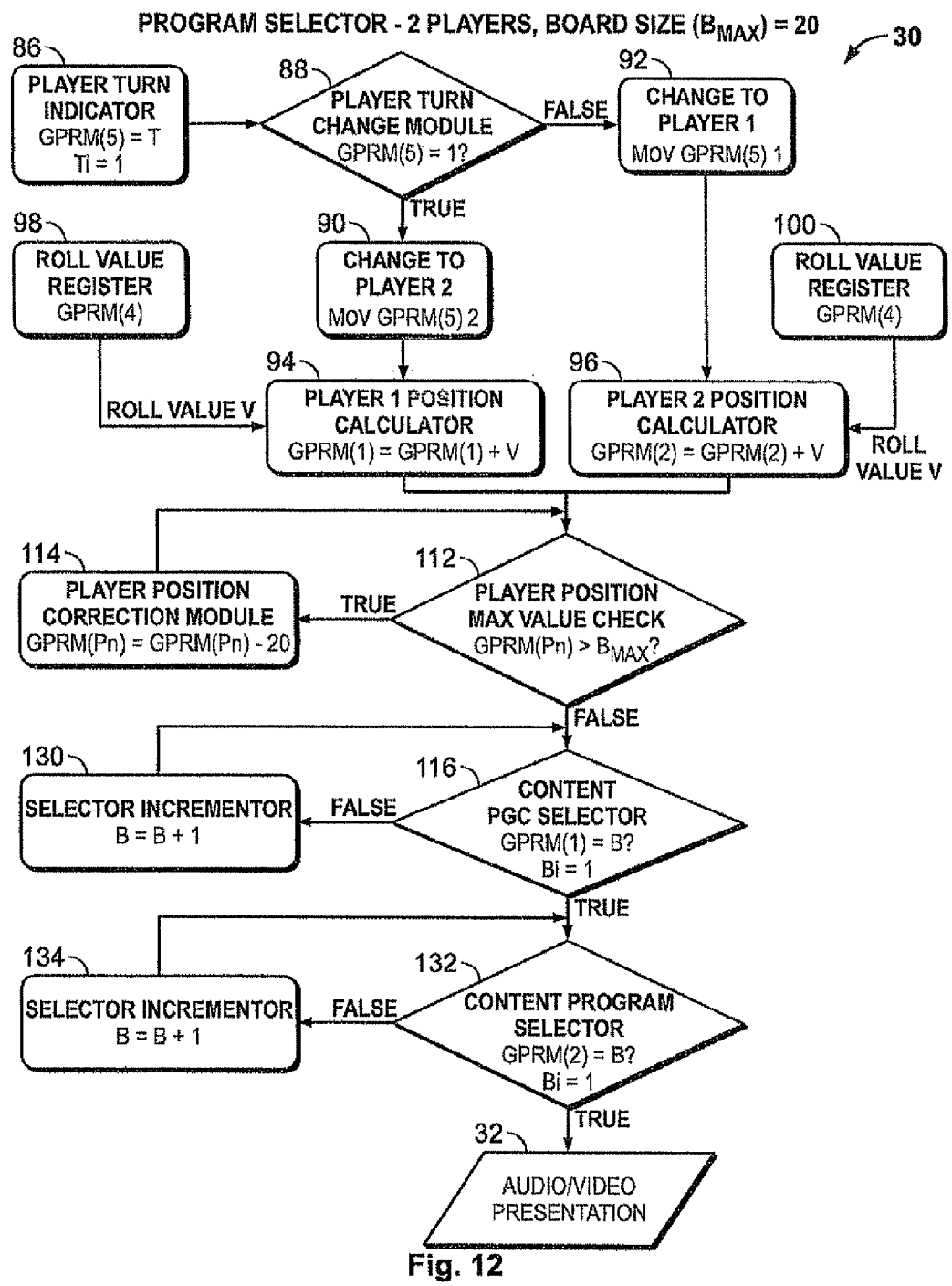
FIG. 12 is a block diagram of a program selector module included in the example referenced in FIG. 11.

As shown in FIG. 12, an embodiment of the program selector module 30 first defines the current player's turn as general parameter register 5 ("GPRM(5)") 86, with an initial turn value, $T_i$, equal to 1 (e.g., player 1 goes first). Next the player turn change module 88 checks the current value of GPRM(5), and the value 90 or 92 for player 1 and 2, respectively, is changed. That is, if the current dice roll applies to player 1's position, GPRM(5) is changed to the value "2" so that the subsequent dice roll will apply to player 2's position.

Next the current player's position is calculated using a player calculator 94 and 96, respectively, for players 1 and 2, by adding the player's current position (denoted by GPRM(1) for player 1 and GPRM(2) for player 2) to the value of the current dice roll previously stored into a roll value register ("GPRM(4)") 98 and 100, respectively, for players 1 and 2 (see FIG. 11). For example, for player 1, GPRM(1)=GPRM(1)+V, where V equals the value of the current dice roll and is defined in the table 102 shown in FIG. 13. The DVD syntax for the player turn change module and player position calculators is shown in the Post-Command 104 of PGC.2 84 Cmnd.1 106 through Cmnd.5 107 and Cmnd.10 108 through Cmnd.10 110 in FIG. 15*c*.

Next, the player position maximum value check module 112 checks if the new player position (GPRM(1) or GPRM(2)) is greater than the largest position number on the game board 70 ($B_{max}$). In this example $B_{max}$ equals 20. In the case that the value of the new player position is greater than $B_{max}$ the player position is corrected by the player position correction module 114, which subtracts the value of $B_{max}$ from the current position, e.g., GPRM(1)=GPRM(1)−20. In the case that the value of the new player position is not greater than $B_{max}$, operation proceeds to the content PGC selector 116. The DVD syntax for the maximum value check module and player position correction module is shown in the Post-Command of PGC.2 84 Cmnd.6 118 through Cmnd.9 120 and Cmnd.12 122 through Cmnd.15 124 in FIG. 15*c*.

Figure 14B:
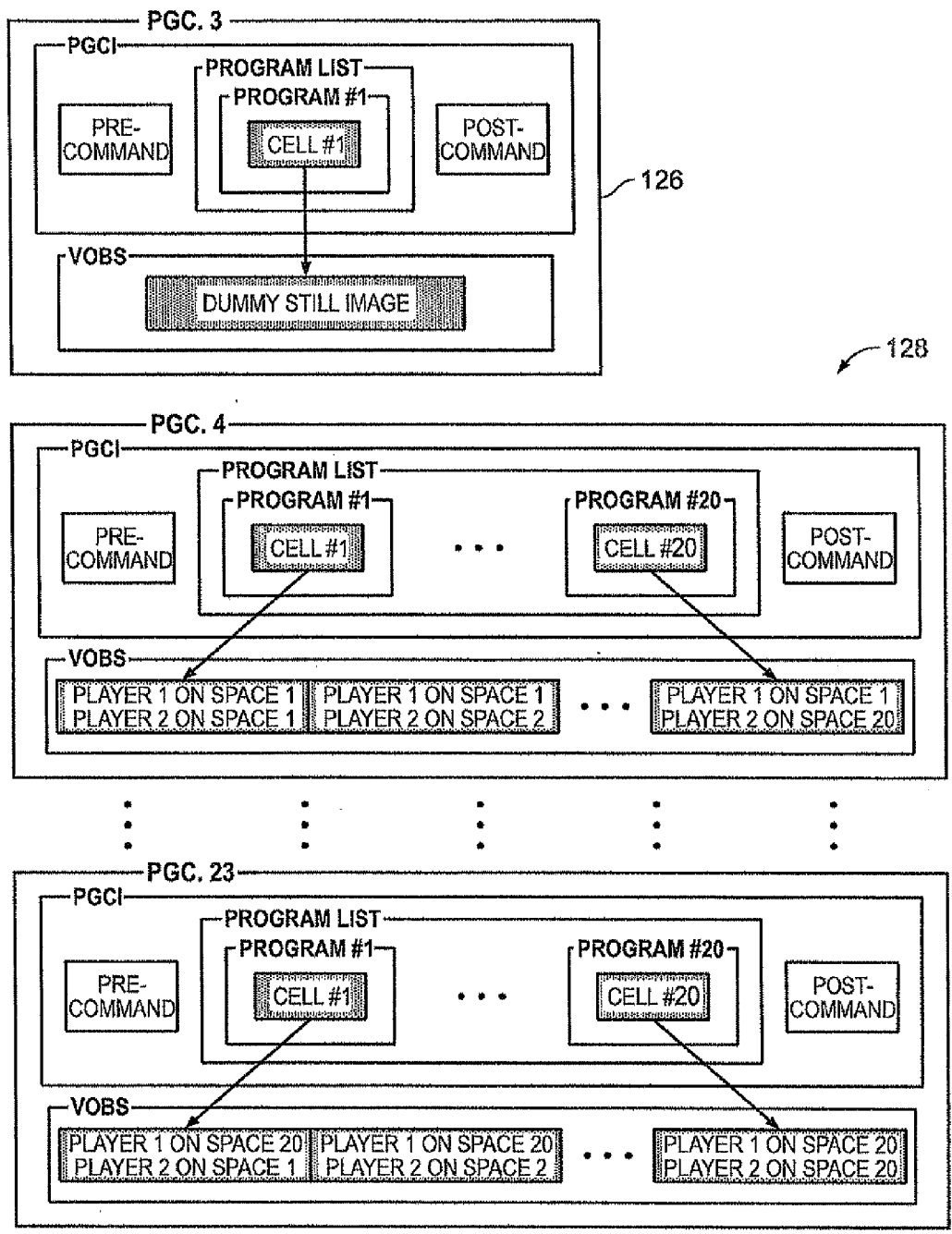

At this point, the board positions (not shown) of both player 1 and player 2 are known. The content PGC selector module 116, implemented with the programming code in PGC.3 126 of FIG. 15*d*, determines which content PGC (PGC's 4 thru 23, see FIG. 15*e*) 128 to navigate to based on the board position of player 1 (GPRM(1)). That is, PGC.4 contains all of the competitive position representations in which player 1 is in position "1" on the board, PGC.5 contains all of the competitive position representations in which player 1 is in position "2" on the board, and so on. After a first selector increment module 130 increments the content PGC selector module through all of the possible competitive positions 72 of player 1 and the content PGC is determined, operation proceeds to the content program selector 132, which is incremented through all of the possible positions of player 2 by a second selector incrementor 134. Each PGC (4 thru 23) contains the same content program selector, which determines the program within the current PGC to display. The code for the content program selector is illustrated in PGC.4 of FIG. 15*e*. Each content program contains the audio/video bitstream for a particular positional representation of player 1 and player 2 on the game board 70 shown in FIG. 10. The block diagram of PGC.4 through PGC.23, including the logical positions of each audio/video representation, are shown in FIG. 14*b*. The user can then continue the game by activating the "Roll Dice" button 74 on the display (not shown). The "Roll Dice" button contains the command "LinkPGCN 2" which proceeds to PGC.2 84, and begins the same process as previously described.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. A method for generating a random selection in conjunction with an optical disc played on an electronic device, comprising:
   generating a random number using a random number generator of the electronic device and specifying an upper bound of S+1 on output from the random number generator to generate a random number within a range predetermined by the electronic device to be one of the group consisting of 1 to S+1 or zero to S, wherein S is an integer greater than zero; and
   comparing the random number to a variable only within a range of 1 to S, to enable initiating an audio/visual presentation in response to determining that the variable equals the random number and not initiating the audio/visual presentation in response to determining that the variable does not equal the random number.

2. The method according to claim 1, wherein the random number is generated independently of a prior random number generated by the electronic device.

3. The method according to claim 1, wherein random number is generated conditionally to exclude generating a prior random number generated by the electronic device.

4. The method according to claim 1, wherein the audio/visual presentation is selected from the group consisting of a die, dice, a ball, balls, and a spinner.

5. The method according to claim 1, wherein the audio/visual presentation is selected from the group consisting of a sound effect, sound effects, a musical note, musical notes, and dialogue.

6. The method according to claim 1, wherein the audio/visual presentation is configured to be viewed by a user, and further comprises displaying an image of a button on an audio/visual output device, wherein the button is selectable by the user to initiate the generation of the random number.

7. The method according to claim 1, wherein an event that occurs during the playing of the optical disc automatically initiates the generation of the random number.

8. The method according to claim 1, the method further comprising:
   providing a parameter register in the electronic device;
   storing the random number in the parameter register;
   comparing the random number stored in the parameter register to the variable;
   decrementing the variable number by one, resulting in a decremented variable in response to determining that the random number stored in the parameter register does not equal the variable;
   verifying that the decremented variable is not equal to zero, if the decremented variable is equal to zero, then generating a new random number, if the decremented number is not equal to zero, then the decremented variable is compared to the random number stored in the parameter register; and
   initiating the display of an audio/visual presentation corresponding to the random number when the random number equals the variable or the decremented variable.

9. The method according to claim 8, further comprising:
   checking whether the random number is generated in an independent mode or a conditional mode; and
   checking whether the random number has been previously selected when operating in the conditional mode.

10. A non-transitory computer-readable medium holding encoded instructions, that when executed by a video player, causes the video player to:
    specify an upper bound of S+1 for output from a number generator of the video player, wherein S is a defined integer greater than zero;

generate a result of the number generator within a range predetermined by the video player to be one of the ranges consisting of 1 to S+1 or zero to S;

determine whether the result anywhere in one of the ranges of 1 to S+1 or zero to S equals a predetermined integer that is only in a range of 1 to S;

select one of at least two different video programs for output in response to whether the result of the number generator equals the predetermined integer.

11. The non-transitory computer-readable medium of claim 10, further holding encoded instructions for generating the result of the number generator independently of any prior result of the number generator.

12. The non-transitory computer-readable medium of claim 10, further holding encoded instructions for generating the result of the number generator conditionally to exclude generating a prior result of the number generator.

13. The non-transitory computer-readable medium of claim 10, further holding encoded instructions for selecting the one of at least two different video programs from the group consisting of video program depicting a die, dice, a ball, balls, and a spinner.

14. The non-transitory computer-readable medium of claim 10, further holding encoded instructions for selecting audio data for output from the group consisting of a sound effect, sound effects, a musical note, musical notes, and dialogue, in response to whether the result of the number generator equals the predetermined integer.

15. The non-transitory computer-readable medium of claim 10, further holding encoded instructions for outputting video for depicting an object that is selectable by the user to initiate generating the result of the number generator.

16. The non-transitory computer-readable medium of claim 10, further holding encoded instructions for automatically initiating generating the result of the number generator in response to video output from the video player.

17. A apparatus, comprising:

a video player having a processor for processing video data from a computer-readable medium and outputting a video signal, and a memory coupled to the processor, the memory holding instructions for:

specifying an upper bound of S+1 on output from a pseudo-random number generator of the video player, wherein S is an integer greater than zero;

generating a result of the pseudo-random number generator in a range predetermined by the video player to be one of the ranges consisting of 1 to S+1 or zero to S;

determining whether the result anywhere in a range of zero to S+1 equals a predetermined integer that is only in a range of 1 to S;

selecting one of at least two different video programs for output in response to whether the result of the pseudo-random number generator equals the predetermined integer.

18. The apparatus of claim 17, wherein the memory holds further instructions for generating the result of the pseudo-random number generator independently of any prior result of the pseudo-random number generator.

19. The apparatus of claim 17, wherein the memory holds further instructions for generating the result of the pseudo-random number generator conditionally to exclude generating a prior result of the pseudo-random number generator.

20. The apparatus of claim 17, wherein the memory holds further instructions for selecting the one of at least two different video programs from the group consisting of video program depicting a die, dice, a ball, balls, and a spinner.

21. The apparatus of claim 17, wherein the memory holds further instructions for selecting audio data for output from the group consisting of a sound effect, sound effects, a musical note, musical notes, and dialogue, in response to whether the result of the pseudo-random number generator equals the predetermined integer.

22. The apparatus of claim 17, wherein the memory holds further instructions for outputting video for depicting an object that is selectable by the user to initiate generating the result of the pseudo-random number generator.

23. The apparatus of claim 17, wherein the memory holds further instructions for automatically initiating generating the result of the pseudo-random number generator in response to video output from the video player.

* * * * *